US012127247B2

(12) United States Patent
Chen et al.

(10) Patent No.: US 12,127,247 B2
(45) Date of Patent: Oct. 22, 2024

(54) CONTENTION FREE RANDOM ACCESS METHOD AND DEVICE

(71) Applicant: DATANG MOBILE COMMUNICATIONS EQUIPMENT CO., LTD., Beijing (CN)

(72) Inventors: Li Chen, Beijing (CN); Chandrika Kumudinie Worrall, Beijing (CN); Bertrand Pierre, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 3 days.

(21) Appl. No.: 17/614,796

(22) PCT Filed: Feb. 10, 2020

(86) PCT No.: PCT/CN2020/074643
§ 371 (c)(1),
(2) Date: Nov. 29, 2021

(87) PCT Pub. No.: WO2020/238283
PCT Pub. Date: Dec. 3, 2020

(65) Prior Publication Data
US 2022/0248458 A1 Aug. 4, 2022

(30) Foreign Application Priority Data
May 30, 2019 (CN) .......................... 201910464880.0

(51) Int. Cl.
H04W 74/04 (2009.01)
H04W 74/00 (2009.01)

(52) U.S. Cl.
CPC ......... H04W 74/04 (2013.01); H04W 74/006 (2013.01)

(58) Field of Classification Search
CPC ............... H04W 74/04; H04W 74/006; H04W 74/0866; H04W 74/0833; H04W 76/27;
(Continued)

(56) References Cited

U.S. PATENT DOCUMENTS 10,271,355 B2    4/2019  Liu et al.
2022/0210839 A1* 6/2022  Rune ................. H04W 36/0077
2022/0386381 A1* 12/2022 Chitti ................ H04W 74/0833

FOREIGN PATENT DOCUMENTS

CN    102387600 A    3/2012
CN    104780617 A    7/2015
(Continued)

OTHER PUBLICATIONS

3GPP TSG-RAN, Clarification on contention free 2-step RACH, Meeting #106, R2-1905595, Reno, USA, May 13-17, 2019.
(Continued)

Primary Examiner — Thai Nguyen
(74) Attorney, Agent, or Firm — Meunier Carlin & Curfman LLC

(57) ABSTRACT

Disclosed in the embodiments of the present application are a contention free random access method and device, for solving the problem that there are no solutions applicable to a contention free random access 2-step RACH and for performing data transmission by means of a PUSCH resource in a communication process. In the embodiments of the present application, a network side device sends, to a terminal, allocation information of a preamble code and/or a PRACH resource; and the terminal sends a random access request by means of the preamble code and/or the PRACH resource, and sends uplink data on a PUSCH resource corresponding to the preamble code and/or the PRACH resource. Said method provides a two-step random access method for contention free random access, and also provides (Continued)

a method for performing data transmission by means of a PUSCH resource when the contention free random access is performed.

20 Claims, 10 Drawing Sheets

(58) Field of Classification Search
CPC ............. H04W 72/1268; H04W 72/23; H04W 74/002; H04W 36/0077; H04W 72/21; H04B 7/0695; H04B 7/088; H04L 5/0023; H04L 5/0044; H04L 5/0053
See application file for complete search history.

(56) References Cited

FOREIGN PATENT DOCUMENTS

| | | | | |
|---|---|---|---|---|
| CN | 107302798 | A | 10/2017 | |
| CN | 109219972 | A | 1/2019 | |
| EP | 3905831 | A1 | 11/2021 | |
| KR | 20180129621 | A | 12/2018 | |
| WO | 2018085726 | A1 | 11/2018 | |
| WO | 2019051373 | A1 | 3/2019 | |
| WO | WO-2020142683 | A1 * | 7/2020 | ........ H04W 72/1263 |
| WO | WO-2020222181 | A1 * | 11/2020 | ........ H04W 36/0077 |

OTHER PUBLICATIONS

OPPO: "Clarification on contention free 2-step RACH", 3GPP Draft; RP 191072 vol. TSG RAN, No. Newport Beach California, USA; Jun. 3, 2019-Jun. 6, 2019 May 27, 2019 (May 27, 2019), XP051739356, Retrieved from the Internet: URL:http://www.3gpp.org/ftp/tsg%5Fran/TSG%5FRAN/TSG%5F84/Docs/RP%2DI91072%2Ezip [retrieved on May 27, 2019].

QUALCOMM Incorporated: "2-step RACH for CFRA BFR", 3GPP Draft; R2-1907914 vol. RAN WG2, No. Reno, Nevada, US; May 13, 2019-May 17, 2019 May 13, 2019 (May 13, 2019), XP051731331, Retrieved from the Internet: URL:http://www.3gpp.org/ftp/Meetings%5F3GPP%5FSYNC/RAN2/Docs/R2%2DI907914%2Ezip [retrieved on May 13, 2019].

Huawei et al: "Discussion on the MsgA resource configuration", 3GPP Draft; R2-1907730 vol. RAN WG2, No. Reno, US; May 13, 2019-May 17, 2019 May 13, 2019 (May 13, 2019), XP051731161, Retrieved from the Internet: URL:http://www.3gpp.org/ftp/Meetings%5F3GPP%5FSYNC/RAN2/Docs/R2%DI907730%2Ezip retrieved on May 13, 2019].

* cited by examiner

CONTENTION FREE RANDOM ACCESS METHOD AND DEVICE

CROSS-REFERENCE TO RELATED APPLICATIONS

The disclosure is a National Stage of International Application No. PCT/CN2020/074643, filed on Feb. 10, 2020, which claims priority to the Chinese Patent Application No. 201910464880.0, filed to China National Intellectual Property Administration on May 30, 2019, the entire content of which is incorporated herein by reference.

FIELD

The disclosure relates to the technical field of radio communication, in particular to a contention free random access method and device.

BACKGROUND

At present, in the communication process, conventional random access of LTE (Long Term Evolution) and NR Rel-15 is divided into two types: contention based random access and contention free random access. Among them, a contention based random access process is shown in FIG. 1, which is divided into four steps, called a 4-step RACH (Random Access Channel). A contention free random access process is shown in FIG. 2, which is mainly divided into three steps, namely Msg0: a base station assigns a dedicated preamble for contention free random access and a PRACH (Physical Random Access Channel) resource for random access to a user equipment, (UE); Msg1: the UE sends the designated dedicated preamble to the base station on the designated PRACH resource according to an instruction in Msg0, and after receiving Msg1, the base station calculates uplink timing advance (TA) according to Msg1; and Msg2: the base station sends a random access response to the UE, wherein the random access response contains timing advance information and subsequent uplink transmission resource assignment (UL grant), and the timing advance is used for a timing relationship of the UE's subsequent uplink transmission.

In an NR Rel-16 system, as shown in FIG. 3, a 2-step random access process (2-step RACH) is derived based on the 4-step RACH. At present, the 2-step RACH is only applicable to contention based random access and is not applicable to contention free random access. At the same time, there is no scheme for data transmission through a PUSCH (Physical Uplink Shared Channel) resource (i.e., uplink data transmission resource) in a current contention free random access process.

To sum up, there is no 2-step RACH suitable for contention free random access and scheme for data transmission on the PUSCH resource in a radio communication process.

SUMMARY

Embodiments of the disclosure provide a contention free random access method and device, which are used to solve the problem that there is currently no 2-step RACH suitable for contention free random access and data transmission on a PUSCH resource in a radio communication process.

In a first aspect, an embodiment of the disclosure provides a contention free random access method, including: sending, by a network side device, configuration information of a preamble for contention free random access and/or a PRACH resource for contention free random access to a UE when the UE performs contention free random access, so that the UE sends a random access request through the preamble for contention free random access and/or the PRACH resource for contention free random access, and sends uplink data on a PUSCH resource corresponding to the preamble for contention free random access and/or the PRACH resource for contention free random access; and receiving, by the network side device, the random access request from the UE according to the preamble for contention free random access and/or the PRACH resource for contention free random access, and receiving the uplink data from the UE on the PUSCH resource corresponding to the preamble for contention free random access and/or the PRACH resource for contention free random access.

In the abovementioned method, a 2-step random access method for contention free random access is provided, i.e. uplink transmission is sent while a preamble is sent. At the same time, through the abovementioned method, a method of performing data transmission on a PUSCH resource when contention free random access is performed is provided.

In a possible implementation, before the network side device sends the configuration information of the preamble for contention free random access and/or the PRACH resource for contention free random access to the UE when the UE performs contention free random access, the method further includes: informing, by the network side device, the UE of a correspondence relationship between preambles for contention free random access and/or PRACH resources for contention free random access and PUSCH resources through a system message or dedicated RRC signaling.

In the abovementioned method, a manner for assisting the UE in determining the PUSCH resource corresponding to the received preamble and/or PRACH resource is provided, i.e. after the network side device informs the UE of the correspondence relationship between the preambles for contention free random access and/or the PRACH resources for contention free random access and the PUSCH resources through the system message or the dedicated RRC signaling so that the UE can receive the configuration information of the preamble for contention free random access and/or the PRACH resource for contention free random access sent by the network side device, the PUSCH resource corresponding to the received preamble and/or PRACH resource sent by the network side device is determined according to the correspondence relationship.

In a possible implementation, the sending, by the network side device, the configuration information of the preamble for contention free random access and/or the PRACH resource for contention free random access to the UE when the UE performs contention free random access includes: sending, by the network side device, the configuration information of the preamble for contention free random access and/or the PRACH resource for contention free random access to the UE through a PDCCH command when the UE performs contention free random access.

In the abovementioned method, a scenario where the network side device performs contention free random access with the UE is provided, i.e. when the UE performs contention free random access, the network side device sends the configuration information of the preamble for contention free random access and/or the PRACH resource for contention free random access to the UE through the PDCCH command.

In a possible implementation, the sending, by the network side device, the configuration information of the preamble for contention free random access and/or the PRACH resource for contention free random access to the UE when the UE performs contention free random access includes: sending, by the network side device, the configuration information of the preamble for contention free random access and/or the PRACH resource for contention free random access to the UE through a synchronous reconfiguration message when the UE performs contention free random access; or sending, by the network side device, the configuration information of the preamble for contention free random access and/or the PRACH resource for contention free random access to the UE through a BFR configuration message when the UE performs contention free random access.

In the abovementioned method, a scenario where a plurality of network side devices perform contention free random access with the UE through RRC signaling is provided. For a first kind, the network side device sends the configuration information of the preamble for contention free random access and/or the PRACH resource for contention free random access to the UE through the synchronous reconfiguration message. For another kind, the network side device sends the configuration information of the preamble for contention free random access and/or the PRACH resource for contention free random access to the UE through the BFR configuration message.

In a possible implementation, the sending, by the network side device, the configuration information of the preamble for contention free random access and/or the PRACH resource for contention free random access to the UE when the UE performs contention free random access includes: sending, by the network side device, the configuration information of the preamble for contention free random access and the PRACH resource for contention free random access as well as configuration information of the PUSCH resource corresponding to the preamble for contention free random access and/or the PRACH resource for contention free random access to the UE through a BFR configuration message when the UE performs contention free random access; or sending, by the network side device, the configuration information of the preamble for contention free random access and the PRACH resource for contention free random access as well as the configuration information of the PUSCH resource corresponding to the preamble for contention free random access and/or the PRACH resource for contention free random access to the UE through a synchronous reconfiguration message when the UE performs contention free random access.

In the abovementioned method, another manner for assisting the UE in determining the PUSCH resource corresponding to the received preamble and/or PRACH resource is provided, i.e. when the network side device sends configuration information of the preamble for contention free random access and/or the PRACH resource for contention free random access to the UE, configuration information of the PUSCH resource corresponding to the preamble and/or the PRACH resource is sent to the UE all together. Therefore, the UE determines a PUSCH resource corresponding to the received configuration information of a PUSCH resource sent by the network side device, and determines the PUSCH resource, corresponding to the configuration information of the PUSCH resource, to be the PUSCH resource corresponding to the preamble and/or the PRACH resource.

In a possible implementation, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

In the abovementioned method, correspondence relationships between a plurality of preambles for contention free random access and/or PRACH resources for contention free random access and the PUSCH resource are provided, and the applicability is higher.

In a possible implementation, after the network side device receives the random access request from the UE according to the preamble for contention free random access and/or the PRACH resource for contention free random access, and receives the uplink data sent by the UE on the PUSCH resource corresponding to the preamble for contention free random access and/or the PRACH resource for contention free random access, the method further includes: in a condition that the network side device determines that the preamble for contention free random access from the UE is received while the uplink data sent by the UE on the PUSCH resource is not received: sending, by the network side device, a media access control random access response (MAC RAR) to the UE, wherein the MAC RAR includes an uplink (UL) grant and a timing advance command (TAC); or sending, by the network side device, a physical downlink control channel (PDCCH) command carrying a cell radio network temporary identifier (C-RNTI) to the UE to complete contention resolution, and assigning, by the network side device, an uplink transmission resource to the UE; or in a condition that the network side device determines that the preamble for contention free random access from the UE and the uplink data sent by the UE on the PUSCH resource are correctly received: sending, by the network side device, feedback information of correct reception to the UE; or allocating, by the network side device, a new uplink transmission resource to the UE; or performing, by the network side device, downlink resource assignment for the UE, and sending, by the network side device, TAC MAC control element (CE) to the UE for timing synchronization adjustment.

In the abovementioned method, processing manners after a plurality of network side devices correctly receive the preamble for contention free random access sent by the UE and the uplink data sent by the UE on the PUSCH resource are provided. Processing manners after the plurality of network side devices abnormally receive the preamble for contention free random access sent by the UE and the uplink data sent by the UE on the PUSCH resource are provided.

In a second aspect, a contention free random access method provided by an embodiment of the disclosure includes: receiving, by a UE, configuration information of a preamble for contention free random access and/or a PRACH resource for contention free random access from a network side device when the UE performs contention free random access; determining, by the UE, a PUSCH resource corresponding to the preamble for contention free random access and/or the PRACH resource for contention free random access received from the network side device; and sending, by the UE, a contention based random access request by using the preamble for contention free random access and/or the PRACH resource for contention free random access, and sending uplink data to the network side device on the PUSCH resource.

In the abovementioned method, a 2-step random access method for contention free random access is provided, i.e. uplink transmission is sent while a preamble is sent. At the same time, through the abovementioned method, a method of performing data transmission on a PUSCH resource when contention free random access is performed is provided.

In a possible implementation, before the UE receives the configuration information of the preamble for contention free random access and/or the PRACH resource for contention free random access from the network side device when the UE performs contention free random access, the method includes: receiving, by the UE, a correspondence relationship between preambles for contention free random access and/or PRACH resources for contention free random access and PUSCH resources informed by the network side device through a system message or dedicated radio resource control (RRC) signaling; and determining, by the UE, the PUSCH resource corresponding to the received preamble for contention free random access and/or the PRACH resource for contention free random access sent by the network side device includes: determining, by the UE, the PUSCH resource corresponding to the preamble for contention free random access and/or the PRACH resource for contention free random access received from the network side device according to the correspondence relationship.

In the abovementioned method, a manner for assisting the UE in determining received PUSCH resource corresponding to the preamble and/or PRACH resource is provided, i.e. after the network side device informs the UE of the correspondence relationship between the preambles for contention free random access and/or the PRACH resources for contention free random access and the PUSCH resources through the system message or the dedicated RRC signaling so that the UE can receive the configuration information of the preamble for contention free random access and/or the PRACH resource for contention free random access sent by the network side device, the PUSCH resource corresponding to the received preamble and/or PRACH resource sent by the network side device is determined according to the correspondence relationship.

In a possible implementation, the receiving, by the UE, the configuration information of the preamble for contention free random access and/or the PRACH resource for contention free random access sent by the network side device when the UE performs contention free random access includes: receiving, by the UE, configuration information of the preamble for contention free random access and the PRACH resource for contention free random access as well as configuration information of the PUSCH resource corresponding to the preamble for contention free random access and/or the PRACH resource for contention free random access sent all together by the network side device; and determining, by the UE, the PUSCH resource corresponding to the received preamble for contention free random access and/or the PRACH resource for contention free random access sent by the network side device includes: determining, by the UE, a PUSCH resource corresponding to the configuration information of the PUSCH resource received from the network side device; and determining, by the UE, the PUSCH resource, corresponding to the configuration information of the PUSCH resource, to be the PUSCH resource corresponding to the preamble for contention free random access and/or the PRACH resource for contention free random access.

In the abovementioned method, another manner for assisting the UE in determining the PUSCH resource corresponding to the received preamble and/or PRACH resource is provided, i.e. when the network side device sends configuration information of the preamble for contention free random access and/or the PRACH resource for contention free random access to the UE, the configuration information of the PUSCH resource corresponding to the preamble and/or the PRACH resource is sent to the UE all together. Therefore, the UE determines a PUSCH resource corresponding to the received configuration information of the PUSCH resource sent by the network side device, and determines the PUSCH resource, corresponding to the configuration information of the PUSCH resource, to be the PUSCH resource corresponding to the preamble for contention free random access and/or the PRACH resource for contention free random access.

In a possible implementation, the receiving, by the UE, the configuration information of the preamble for contention free random access and/or the PRACH resource for contention free random access from the network side device when the UE performs contention free random access includes: receiving, by the UE, the configuration information of the preamble for contention free random access and/or the PRACH resource for contention free random access sent by the network side device through a physical downlink control channel (PDCCH) command.

In the abovementioned method, a scenario where the network side device performs contention free random access with the UE is provided, i.e. the UE receives the configuration information of the preamble for contention free random access and/or the PRACH resource for contention free random access sent by the network side device through the PDCCH command.

In a possible implementation, the receiving, by the UE, the configuration information of the preamble for contention free random access and/or the PRACH resource for contention free random access from the network side device when the UE performs contention free random access includes: receiving, by the UE, the configuration information of the preamble for contention free random access and/or the PRACH resource for contention free random access from the network side device through a synchronous reconfiguration message; or receiving, by the UE, the configuration information of the preamble for contention free random access and/or the PRACH resource for contention free random access from the network side device through a BFR configuration message.

In the abovementioned method, a scenario where a plurality of network side devices perform contention free random access with the UE through RRC signaling is provided. For a first kind, the UE receives the configuration information of the preamble for contention free random access and/or the PRACH resource for contention free random access sent by the network side device through the synchronous reconfiguration message. For another kind, the UE receives the configuration information of the preamble for contention free random access and/or the PRACH resource for contention free random access sent by the network side device through the BFR configuration message.

In a possible implementation, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

In the abovementioned method, a correspondence relationship between a plurality of preambles for contention free random access and/or PRACH resources for contention free random access and the PUSCH resources are provided, and the applicability is higher.

In a possible implementation, after the UE sends uplink data transmission to the network side device on the PUSCH resource, the method further includes: performing, by the UE, uplink synchronization adjustment according to a timing advance command (TAC) in a media access control random access response (MAC RAR), and performing, by the UE, uplink transmission in an uplink (UL) grant assigned by the MAC RAR, in a condition that the UE determines that the MAC RAR from the network side device is received; or performing, by the UE, resource sending or receiving according to a physical downlink control channel (PDCCH) command, in a condition that the UE determines that the PDCCH command carrying a cell radio network temporary identifier (C-RNTI) from the network side device is received; or determining, by the UE, success of random access and success transmission on PUSCH in a condition that the UE determines that the UE receives feedback information of correct reception for PUSCH resource transmission from the network side device, or a new uplink transmission scheduling command from the network side device, or TAC MAC CE from the network side device, and performing, by the UE, operations according to the information received from the network side device.

In the abovementioned method, a plurality of processing manners executed by the UE after the UE receives a command sent by the network side device are introduced. Among them, the command sent by the network side device is sent after the preamble for contention free random access sent by the UE and the uplink data sent by the UE on the PUSCH resource are received.

In a third aspect, an embodiment of the disclosure provides a contention free random access device, including: a processor, a memory, and a transceiver. The processor is configured to send configuration information of a preamble for contention free random access and/or a PRACH resource for contention free random access to a UE when the UE performs contention free random access, so that the UE sends a random access request through the preamble for contention free random access and/or the PRACH resource for contention free random access, and sends uplink data on a PUSCH resource corresponding to the preamble for contention free random access and/or the PRACH resource for contention free random access; and receive the random access request from the UE according to the preamble for contention free random access and/or the PRACH resource for contention free random access, and receive the uplink data from the UE on the PUSCH resource corresponding to the preamble for contention free random access and/or the PRACH resource for contention free random access.

In a fourth aspect, an embodiment of the disclosure provides a contention free random access device, including: a processor, a memory, and a transceiver. The processor is configured to receive configuration information of a preamble for contention free random access and/or a PRACH resource for contention free random access from a network side device when a UE performs contention free random access; determine a PUSCH resource corresponding to the preamble for contention free random access and/or the PRACH resource for contention free random access received from the network side device; and send a random access request by using the preamble for contention free random access and/or the PRACH resource for contention free random access, and send uplink data to the network side device on the PUSCH resource.

In a fifth aspect, an embodiment of the disclosure provides a contention free random access device. The device includes: at least one processing unit and at least one storage unit, wherein the storage unit stores a program code, and when the program code is executed by the processing unit, the processing unit is enabled to execute the abovementioned first aspect and a method of any possible design related to the first aspect.

In a sixth aspect, an embodiment of the disclosure provides a contention free random access device. The device includes: at least one processing unit and at least one storage unit, wherein the storage unit stores a program code, and when the program code is executed by the processing unit, the processing unit is enabled to execute the abovementioned second aspect and a method of any possible design related to the second aspect.

In a seventh aspect, an embodiment of the disclosure further provides a computer storage medium, wherein the computer storage medium stores a computer program, and the program, when executed by a processor, implements the first aspect and a method of any possible design related to the first aspect.

In an eighth aspect, the disclosure further provides a computer storage medium, wherein the computer storage medium stores a computer program, and the program, when executed by a processor, implements the second aspect and a method of any possible design related to the second aspect.

In a ninth aspect, the disclosure further provides a computer program product. When the computer program product runs on an electronic device, the electronic device is enabled to execute the abovementioned aspects of the embodiment of the disclosure and a method of any possible design related to the aspects.

Further, for technical effects brought by any implementation from the second aspect to the ninth aspect, reference may be made to technical effects brought by different implementations in the first aspect and the second aspect, and repetition will not be made here.

BRIEF DESCRIPTION OF THE DRAWINGS

In order to explain the technical solutions in the embodiments of the disclosure more clearly, the accompanying drawings needed in the description of the embodiments will be briefly introduced below. Apparently, the accompanying drawings in the following description are only some embodiments of the embodiments of the disclosure. For those of ordinary skill in the art, other drawings can be obtained based on these accompanying drawings without creative labor.

DETAILED DESCRIPTION OF THE EMBODIMENTS

In order to make the objectives, technical solutions, and advantages of the embodiments of the disclosure clearer, the embodiments of the disclosure will be further described in detail with reference to the accompanying drawings. Apparently, the described embodiments are only a part of the embodiments of the disclosure, rather than all the embodiments. Based on the embodiments in the embodiments of the disclosure, all other embodiments obtained by those of ordinary skill in the art without creative effort shall fall within the protection scope of the embodiments of the disclosure.

The following explains some of the words that appear herein.

(1) The term "a plurality of" or "multiple" in the embodiments of the disclosure refers to two or more, and other quantifiers are similar.

(2) "And/or" describes an association relationship of associated objects, which means that there may be three relationships, for example, A and/or B may represent: only A exists, A and B exist at the same time, or only B exists. The character "/" generally indicates that the associated objects before and after are in an "or" relationship.

(3) "PRACH resource" in the embodiments of the disclosure refers to a channel resource used by UE to send a preamble.

(4) "PUSCH" in the embodiments of the disclosure is configured to carry uplink control information and service data, such as an RRC connection request message sent by the UE.

(5) "RRC signaling" in the embodiments of the disclosure refers to radio resource control signaling, which is carried by SRB, and service data is carried by DRB.

(6) "PDCCH" in the embodiments of the disclosure refers to a physical downlink control channel configured to carry scheduling and other control information, specifically including transmission formats, resource assignment, uplink scheduling granting, power control, and uplink retransmission information.

At present, step msgA in a method of performing contention based random access through a 2-step RACH in the prior art actually includes preamble transmission on a PRACH and data transmission on a PUSCH in the step of contention based random access through a 4-step RACH. Step msgB actually includes random access response and contention resolution in the step of contention based random access through the 4-step RACH. However, the 2-step RACH is quite different from an existing contention free random access method, and is not suitable for a contention free random access process. At the same time, there is no scheme for data transmission through PUSCH resources in a current contention free random access process.

Figure 1:
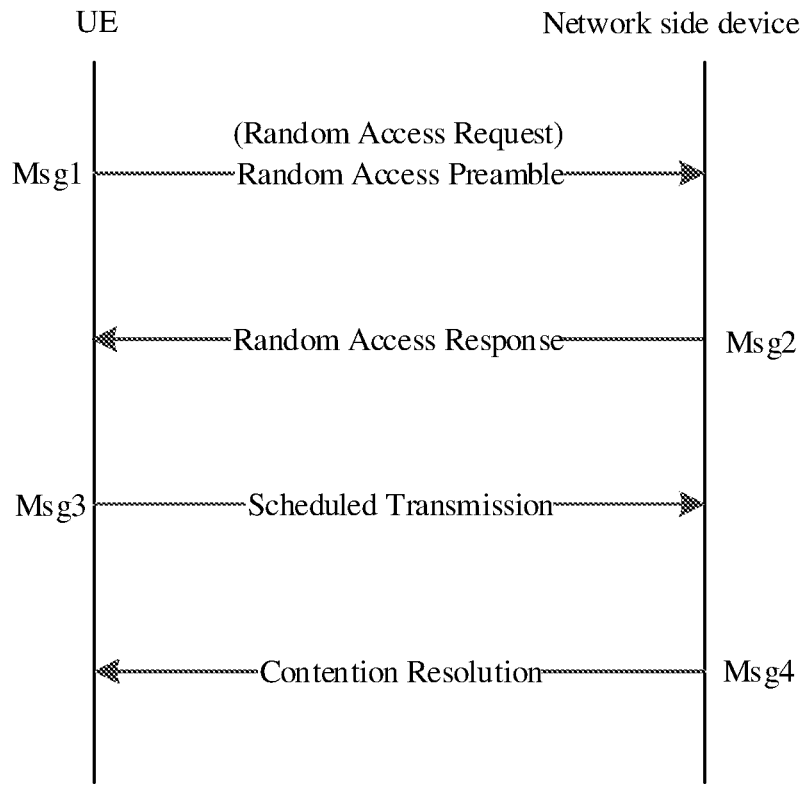
FIG. 1 a schematic flow chart of contention based random access adopting a 4-step RACH in a communication process.
Figure 2:
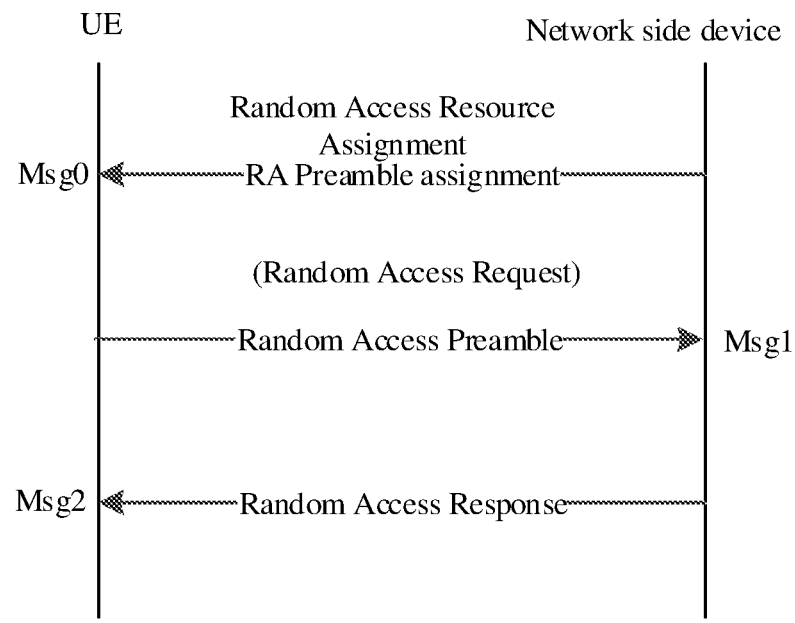
FIG. 2 is a schematic flow chart of contention free random access in a communication process.
Figure 3:
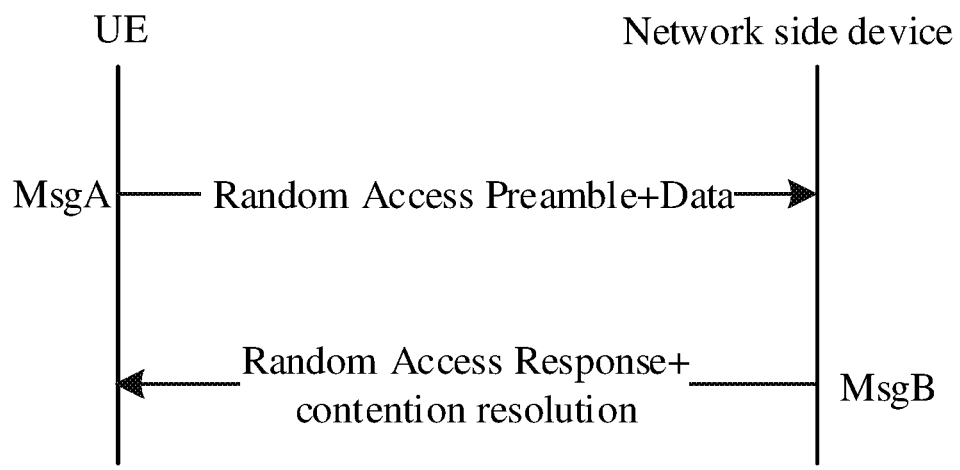
FIG. 3 is a schematic flow chart of contention based random access adopting a 2-step RACH in a communication process.
Figure 4:
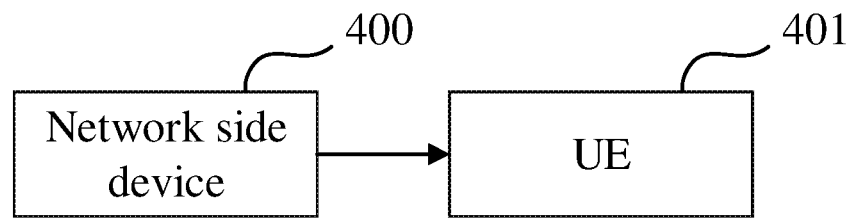
FIG. 4 is a schematic diagram of a system for contention free random access in an embodiment of the disclosure.

To this end, as shown in FIG. 4, an embodiment of the disclosure provides a system for contention free random access, which includes a network side device 400 and a UE 401.

The network side device 400 is configured to send configuration information of a preamble for contention free random access and/or a physical random access channel (PRACH) resource for contention free random access to a user equipment (UE) when the UE performs contention free random access, so that the UE sends a random access request through the preamble for contention free random access and/or the PRACH resource for contention free random access, and sends uplink data on a physical uplink shared channel (PUSCH) resource corresponding to the preamble for contention free random access and/or the PRACH resource for contention free random access. The network side device 400 is further configured to receive the random access request from the UE according to the preamble for contention free random access and/or the PRACH resource for contention free random access, and receive the uplink data from the UE on the PUSCH resource corresponding to the preamble for contention free random access and/or the PRACH resource for contention free random access.

The UE 401 is configured to receive the configuration information of the preamble and the PRACH resource for contention free random access from the network side device when the UE performs contention free random access, determine the PUSCH resource corresponding to the preamble and/or PRACH resource received from the network side device, and send the random access request by using the preamble and/or the PRACH resource, and send uplink data to the network side device on the PUSCH resource.

Through an abovementioned method, a 2-step random access method for contention free random access is provided, i.e., uplink transmission is sent while a preamble is sent. At the same time, through the abovementioned method, a method of performing data transmission on a PUSCH resource when contention free random access is performed is provided.

A plurality of manners for assisting the UE in determining the PUSCH resource corresponding to the received preamble and/or PRACH resource are provided in the embodiment of the disclosure, including, but not limited to, the following.

Determining manner 1: before the network side device sends the configuration information of the preamble for contention free random access and/or the PRACH resource for contention free random access to the UE, the network side device informs the UE of a correspondence relationship between preambles for contention free random access and/or PRACH resources for contention free random access and PUSCH resources through a system message or a dedicated radio resource control (RRC) signaling.

Therefore, after the UE receives the configuration information of the preamble for contention free random access and/or the PRACH resource for contention free random access from the network side device, the PUSCH resource corresponding to the received preamble and/or PRACH resource sent by the network side device is determined according to the correspondence relationship.

The correspondence relationship includes a part or all of the following correspondence relationships.

The PRACH resources for contention free random access are in one-to-one correspondence to the PUSCH resources. The preambles for contention free random access are in one-to-one correspondence to the PUSCH resources. Multiple PRACH resources of the PRACH resources for contention free random access are in correspondence to one PUSCH resource of the PUSCH resources. Multiple preambles of the preambles for contention free random access are in correspondence to one PUSCH resource of the PUSCH resources. A combination of a PRACH resource and a preamble is in correspondence to one PUSCH resource of the PUSCH resources.

The combination of the PRACH resource and the preamble being in correspondence to one PUSCH resource of the PUSCH resources includes one of the following.

A PRACH resource of the PRACH resources for contention free random access and a preamble of the preambles for contention free random access are in correspondence to one PUSCH resource of the PUSCH resources. A PRACH resource of the PRACH resources for contention free random access and a preamble for contention based random access are in correspondence to one PUSCH resource of the PUSCH resources. A PRACH resource for contention based random access and a preamble of the preambles for contention free random access are in correspondence to one PUSCH resource of the PUSCH resources. A PRACH resource of the PRACH resources for contention free random access, a PRACH resource for contention based random access and a preamble for contention based random access are in correspondence to one PUSCH resource of the PUSCH resources. A preamble of the preambles for contention free random access, a PRACH resource for contention based random access and a preamble for contention based random access are in correspondence to one PUSCH resource of the PUSCH resources. A PRACH resource of the PRACH resources for contention free random access, a preamble of the preambles for contention free random access and a PRACH resource for contention based random access are in correspondence to one PUSCH resource of the PUSCH resources. A PRACH resource of the PRACH resources for contention free random access, a preamble of the preambles for contention free random access and a preamble for contention based random access are in correspondence to one PUSCH resource of the PUSCH resources. A PRACH resource of the PRACH resources for contention free random access, a preamble of the preambles for contention free random access, a PRACH resource for contention based random access and a preamble for contention based random access are in correspondence to one PUSCH resource of the PUSCH resources.

Further, if one PUSCH resource is in correspondence to multiple preambles for contention free random access and/or multiple PRACH resources for contention free random access, the PUSCH resource is a PUSCH resource used by a plurality of UEs based on contention.

Determining manner 2: when the network side device sends the configuration information of the preamble for contention free random access and/or the PRACH resource for contention free random access to the UE, configuration information of the PUSCH resource corresponding to the preamble and/or the PRACH resource is sent to the UE all together.

Therefore, the UE determines a PUSCH resource corresponding to the received configuration information of the PUSCH resource sent by the network side device, and determines the PUSCH resource, corresponding to the configuration information of the PUSCH resource, to be the PUSCH resource corresponding to the preamble and/or the PRACH resource.

Further, there are multiple scenarios where the network side device performs contention free random access with the UE. The disclosure respectively introduces different scenarios through the embodiments, including, but not limited to, the following.

Embodiment 1

A scenario in embodiment 1 is that a network side device triggers a UE to perform contention free random access through a PDCCH command.

Figure 5:
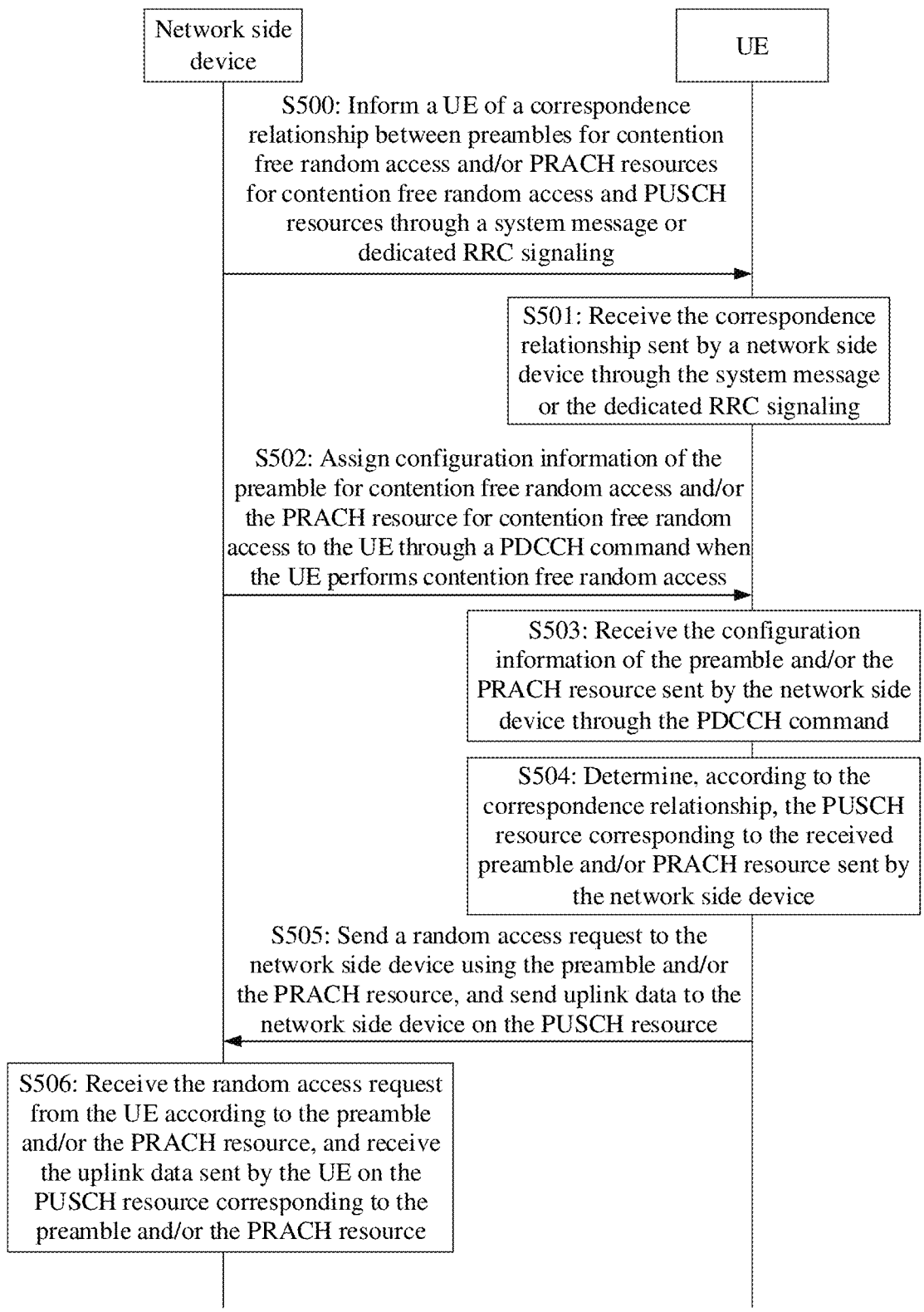
FIG. 5 is a schematic flow chart of first contention free random access in an embodiment of the disclosure.

In the scenario, a flow of the network side device performing contention free random access with the UE may be shown as FIG. 5, and steps are as follows.

S500: the network side device informs the UE of a correspondence relationship between preambles for contention free random access and/or PRACH resources for contention free random access and PUSCH resources through a system message or dedicated RRC signaling.

It should be noted that at the moment, the network side device merely informs the UE of the correspondence relationship between the preambles for contention free random access and/or the PRACH resources for contention free random access and the PUSCH resources. Therefore, the PUSCH resources are not actually used, and the network side device may still schedule the PUSCH resource to other UEs in a cell for uplink transmission.

S501: the UE receives the correspondence relationship sent by the network side device through the system message or the dedicated RRC signaling.

S502: the network side device assigns configuration information of the preamble for contention free random access and/or the PRACH resource for contention free random access to the UE through the PDCCH command when the UE performs contention free random access.

S503: the UE receives the configuration information of the preamble and/or the PRACH resource sent by the network side device through the PDCCH command.

S504: the UE determines, according to the correspondence relationship, the PUSCH resource corresponding to the received preamble and/or PRACH resource sent by the network side device.

S505: the UE sends a random access request to the network side device using the preamble and/or the PRACH resource, and sends uplink data to the network side device on the PUSCH resource.

S506: the network side device receives the random access request from the UE according to the preamble for contention free random access and/or the PRACH resource for contention free random access, and receives the uplink data sent by the UE on the PUSCH resource corresponding to the preamble for contention free random access and/or the PRACH resource for contention free random access.

Further, in S506, in a process of receiving, by the network side device, the preamble for contention free random access sent by the UE and the uplink data sent by the UE on the PUSCH resource, there are cases of correct reception and abnormal reception. For different cases, actions executed by the network side device and the UE in embodiment 1 of the disclosure are different, which will be introduced separately below.

Case 1: the network side device determines abnormal reception of the preamble for contention free random access sent by the UE and the uplink data sent on the PUSCH resource.

For example, the network side device determines that the preamble for contention free random access sent by the UE is received while the uplink data sent by the UE on the PUSCH resource is not received.

At the moment, in one processing manner, the network side device may send a media access control random access response (MAC RAR) to the UE, wherein the MAC RAR includes an uplink (UL) grant and a timing advance command (TAC).

After receiving the MAC RAR sent by the network side device, the UE performs uplink synchronization adjustment according to the TAC command in the MAC RAR, and performs uplink transmission in the UL grant assigned by the MAC RAR.

In another processing manner, the network side device may send a PDCCH command carrying a cell radio network temporary identifier (C-RNTI) to the UE to complete contention resolution, and assign an uplink transmission resource to the UE.

After receiving the PDCCH command carrying the C-RNTI sent by the network side device, the UE performs resource sending or receiving according to the PDCCH command.

Case 2: the network side device determines correct reception of the preamble for contention free random access sent by the UE and the uplink data sent on the PUSCH resource. That is, the network side device determines that the preamble for contention free random access sent by the UE and the uplink data sent by the UE on the PUSCH resource are received.

At the moment, in one processing manner, the network side device sends feedback of success transmission on PUSCH to the UE.

After receiving the feedback of success transmission on PUSCH sent by the network side device, the UE determines success of random access and success transmission on PUSCH.

In another processing manner, the network side device assigns a new uplink transmission resource to the UE.

After receiving the new uplink transmission resource assigned by the network side device, the UE determines success of random access and success transmission on PUSCH, and performs following operations according to received information sent by the network side device.

In further another processing manner, the network side device performs downlink resource assignment to the UE, and sends TAC MAC control element (CE) to the UE for timing synchronization adjustment.

After receiving the TAC MAC CE transmitted by the network side device, the UE determines success of random access and success transmission on PUSCH, and performs following operations according to received information sent by the network side device.

Embodiment 2

A scenario of embodiment 2 is a first method that the network side device triggers the UE to perform contention free random access through an RRC command, i.e. triggers handover or SCell addition.

In the scenario, varying from manners for assisting the UE in determining a PUSCH resource corresponding to a received preamble and/or PRACH resource adopted in embodiment 2 of the disclosure, flows of the network side device performing contention free random access with the UE are different.

Figure 6:
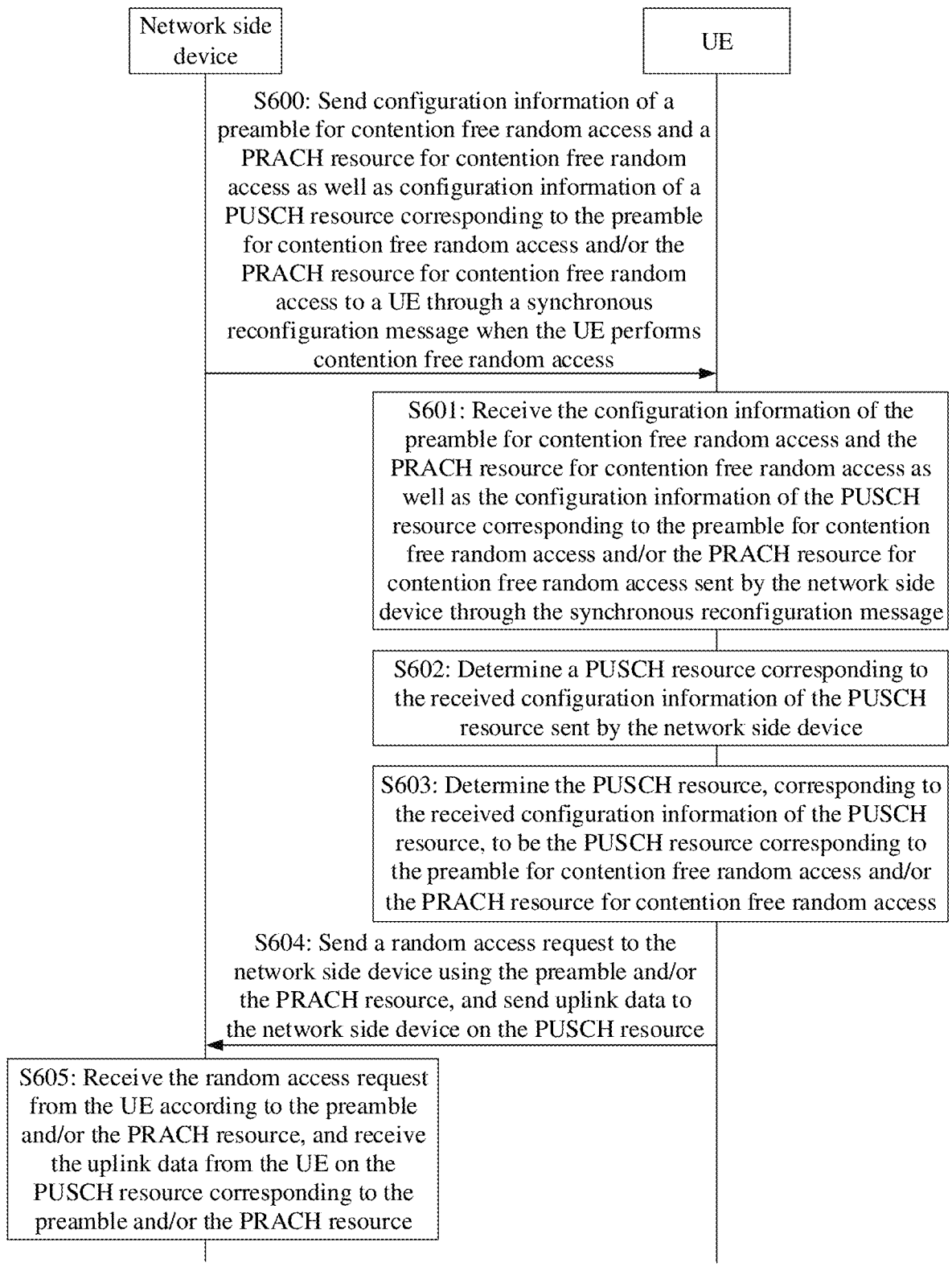
FIG. 6 is a schematic flow chart of second contention free random access in an embodiment of the disclosure.

If in embodiment 2 of the disclosure, the method of the abovementioned determining manner 1 is adopted for assisting the UE in determining the PUSCH resource corresponding to the received preamble and/or PRACH resource, a flow of the network side device performing contention free random access with the UE may be shown as FIG. 6, and steps are as follows.

S600: the network side device sends configuration information of a preamble for contention free random access and a PRACH resource for contention free random access as well as configuration information of a PUSCH resource corresponding to the preamble for contention free random access and/or the PRACH resource for contention free random access to the UE through a synchronous reconfiguration message when the UE performs contention free random access.

S601: the UE receives the configuration information of the preamble for contention free random access and the PRACH resource for contention free random access as well as the configuration information of the PUSCH resource corresponding to the preamble for contention free random access and/or the PRACH resource for contention free random access sent by the network side device through the synchronous reconfiguration message.

S602: the UE determines a PUSCH resource corresponding to the received configuration information of the PUSCH resource sent by the network side device.

S603: the UE determines the PUSCH resource, corresponding to the received configuration information of the PUSCH resource, to be the PUSCH resource corresponding to the preamble for contention free random access and/or the PRACH resource for contention free random access.

S604: the UE sends a random access request to the network side device by using the preamble and/or the PRACH resource, and sends uplink data to the network side device on the PUSCH resource.

S605: the network side device receives the random access request from the UE according to the preamble for contention free random access and/or the PRACH resource for contention free random access, and receives the uplink data from the UE on the PUSCH resource corresponding to the preamble for contention free random access and/or the PRACH resource for contention free random access.

Figure 7:
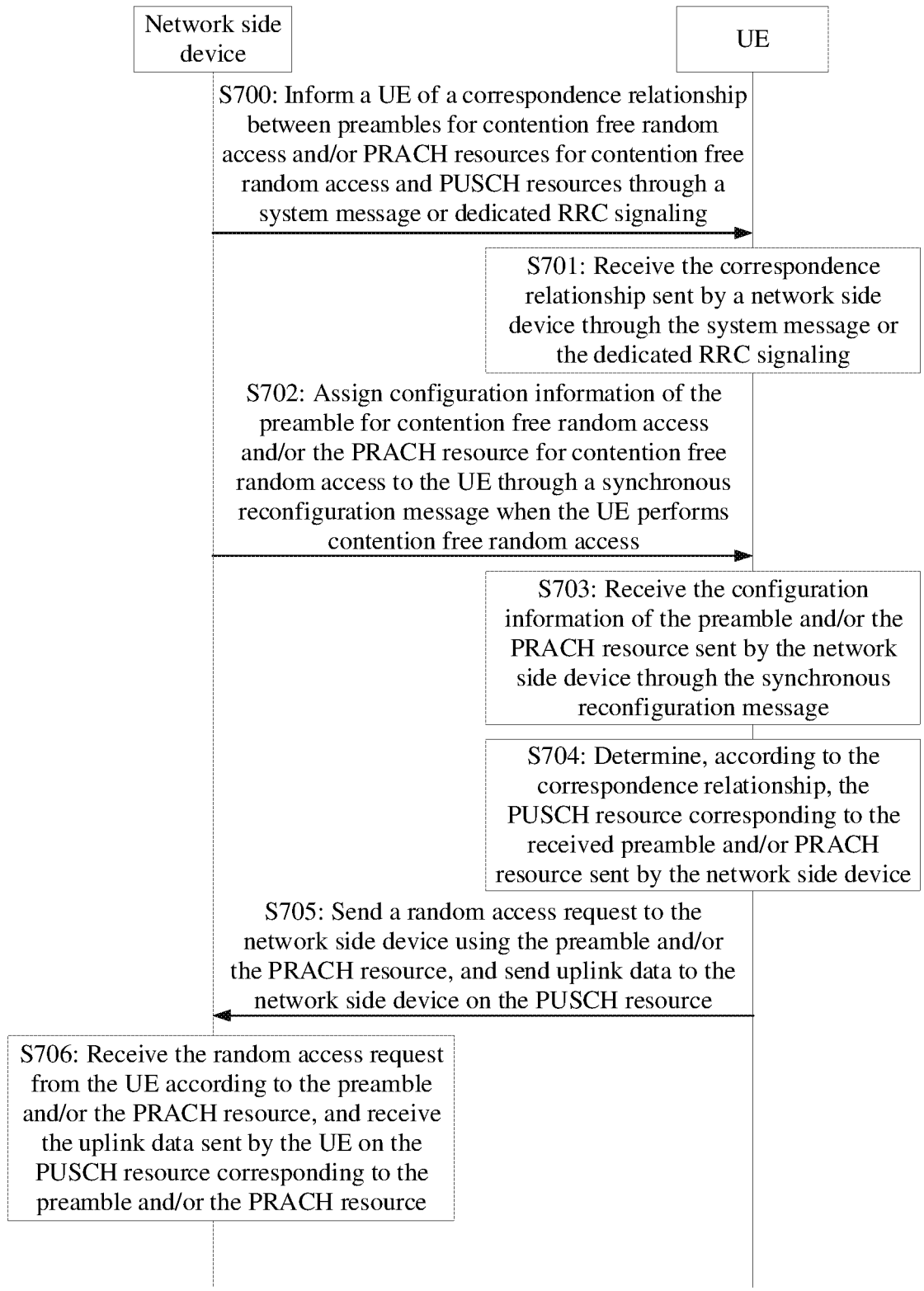
FIG. 7 is a schematic flow chart of third contention free random access in an embodiment of the disclosure.

If in embodiment 2 of the disclosure, the method of the abovementioned determining manner 2 is adopted for assisting the UE in determining the PUSCH resource corresponding to the received preamble and/or PRACH resource, a flow of the network side device performing contention free random access with the UE may be shown as FIG. 7, and specific steps are as follows.

S700: the network side device informs the UE of a correspondence relationship between preambles for contention free random access and/or PRACH resources for contention free random access and PUSCH resources through a system message or dedicated RRC signaling.

It should be noted that at the moment, the network side device merely informs the UE of the correspondence relationship between the preambles for contention free random access and/or the PRACH resources for contention free random access and the PUSCH resources. Therefore, the PUSCH resources are not actually used, and the network side device may still schedule the PUSCH resources to other UEs in a cell for uplink transmission.

S701: the UE receives the correspondence relationship sent by the network side device through the system message or the dedicated RRC signaling.

S702: the network side device assigns the configuration information of the preamble for contention free random access and/or the PRACH resource for contention free random access to the UE through a synchronous reconfiguration message when the UE performs contention free random access.

S703: the UE receives the configuration information of the preamble and/or the PRACH resource sent by the network side device through the synchronous reconfiguration message.

S704: the UE determines, according to the correspondence relationship, the PUSCH resource corresponding to the received preamble and/or PRACH resource sent by the network side device.

S705: the UE sends a random access request to the network side device by using the preamble and/or the PRACH resource, and sends uplink data to the network side device on the PUSCH resource.

S706: the network side device receives the random access request from the UE according to the preamble for contention free random access and/or the PRACH resource for contention free random access, and receives the uplink data sent by the UE on the PUSCH resource corresponding to the preamble for contention free random access and/or the PRACH resource for contention free random access.

Further, in S605 or S706, in a process of receiving, by the network side device, the preamble for contention free random access sent by the UE and the uplink data sent by the UE on the PUSCH resource, there are cases of correct reception and abnormal reception. For different cases, actions executed by the network side device and the UE in embodiment 2 of the disclosure are different, which will be introduced separately below.

Case 1: the network side device determines abnormal reception of the preamble for contention free random access sent by the UE and the uplink data sent on the PUSCH resource.

For example, the network side device determines that the preamble for contention free random access sent by the UE is received while the uplink data sent by the UE on the PUSCH resource is not received.

At the moment, in one processing manner, the network side device may send a random access response MAC RAR to the UE, wherein the MAC RAR includes a UL grant and a TAC.

After receiving the random access response command MAC RAR sent by the network side device, the UE performs uplink synchronization adjustment according to the TAC in the MAC RAR, and performs uplink transmission in the UL grant assigned by the MAC RAR.

In another processing manner, the network side device may send a PDCCH command carrying a C-RNTI to the UE to complete contention resolution, and assign an uplink transmission resource to the UE.

After receiving the PDCCH command carrying the C-RNTI sent by the network side device, the UE performs resource sending or receiving according to the PDCCH command.

Case 2: the network side device determines correct reception of the preamble for contention free random access sent by the UE and the uplink data sent on the PUSCH resource. That is, the network side device determines that the preamble for contention free random access sent by the UE and the uplink data sent by the UE on the PUSCH resource are received.

At the moment, in one processing manner, the network side device sends feedback information of correct reception to the UE.

After receiving the feedback information of correct reception for transmission of the PUSCH resource sent by the network side device, the UE determines success of random access and success transmission on PUSCH.

In another processing manner, the network side device assigns a new uplink transmission resource to the UE.

After receiving the new uplink transmission resource assigned by the network side device, the UE determines success of random access and success transmission on PUSCH, and performs following operations according to received information sent by the network side device.

In further another processing manner, the network side device performs downlink resource assignment to the UE, and sends TAC MAC CE to the UE for timing synchronization adjustment.

After receiving the TAC MAC CE transmitted by the network side device, the UE determines success of random access and success transmission on PUSCH, and performs following operations according to received information sent by the network side device.

Embodiment 3

A scenario of embodiment 3 is a second method that a network side device triggers the UE to perform contention free random access through an RRC command, i.e. assigns a beam failure recovery (BFR) contention free random access resource through the RRC command.

In the scenario, varying from manners for assisting the UE in determining a PUSCH resource corresponding to a received preamble and/or PRACH resource adopted in embodiment 3 of the disclosure, flows of the network side device performing contention free random access with the UE are different.

Figure 8:
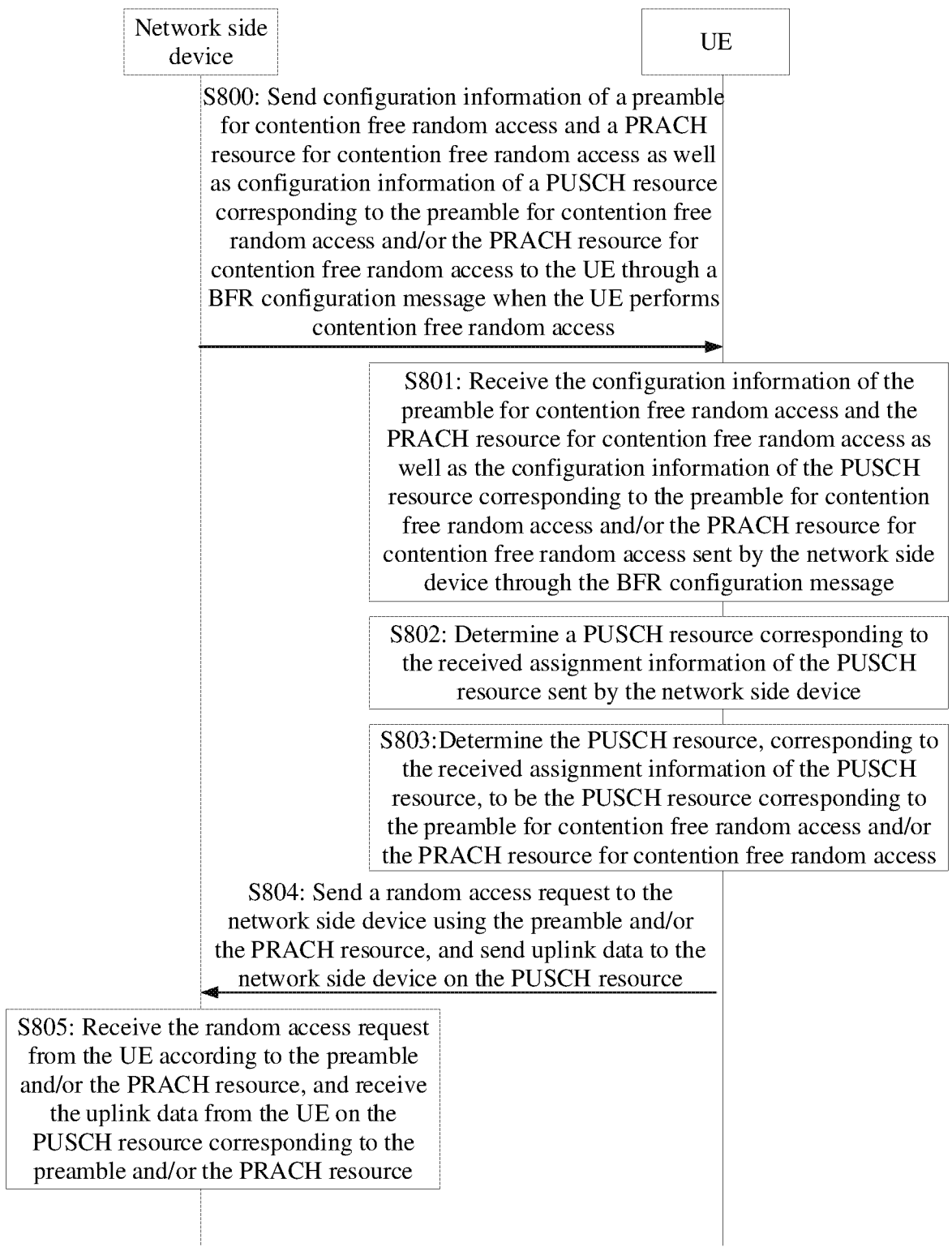
FIG. 8 is a schematic flow chart of fourth contention free random access in an embodiment of the disclosure.

If in embodiment 3 of the disclosure, the method of the abovementioned determining manner 1 is adopted for assisting the UE in determining the PUSCH resource corresponding to the received preamble and/or PRACH resource, a flow of the network side device performing contention free random access with the UE may be shown as FIG. 8, and steps are as follows.

S800: the network side device sends configuration information of a preamble for contention free random access and a PRACH resource for contention free random access as well as configuration information of a PUSCH resource corresponding to the preamble for contention free random access and/or the PRACH resource for contention free random access to the UE through a BFR configuration message when the UE performs contention free random access.

S801: the UE receives the configuration information of the preamble for contention free random access and the PRACH resource for contention free random access as well as the configuration information of the PUSCH resource corresponding to the preamble for contention free random access and/or the PRACH resource for contention free random access sent by the network side device through the BFR configuration message.

S802: the UE determines a PUSCH resource corresponding to the received configuration information of the PUSCH resource sent by the network side device.

S803: the UE determines the PUSCH resource, corresponding to the received configuration information of the PUSCH resource, to be the PUSCH resource corresponding to the preamble for contention free random access and/or the PRACH resource for contention free random access.

S804: the UE sends a random access request to the network side device by using the preamble and/or the PRACH resource, and sends uplink data to the network side device on the PUSCH resource.

S805: the network side device receives the random access request from the UE according to the preamble for contention free random access and/or the PRACH resource for contention free random access, and receives the uplink data from the UE on the PUSCH resource corresponding to the preamble for contention free random access and/or the PRACH resource for contention free random access.

Figure 9:
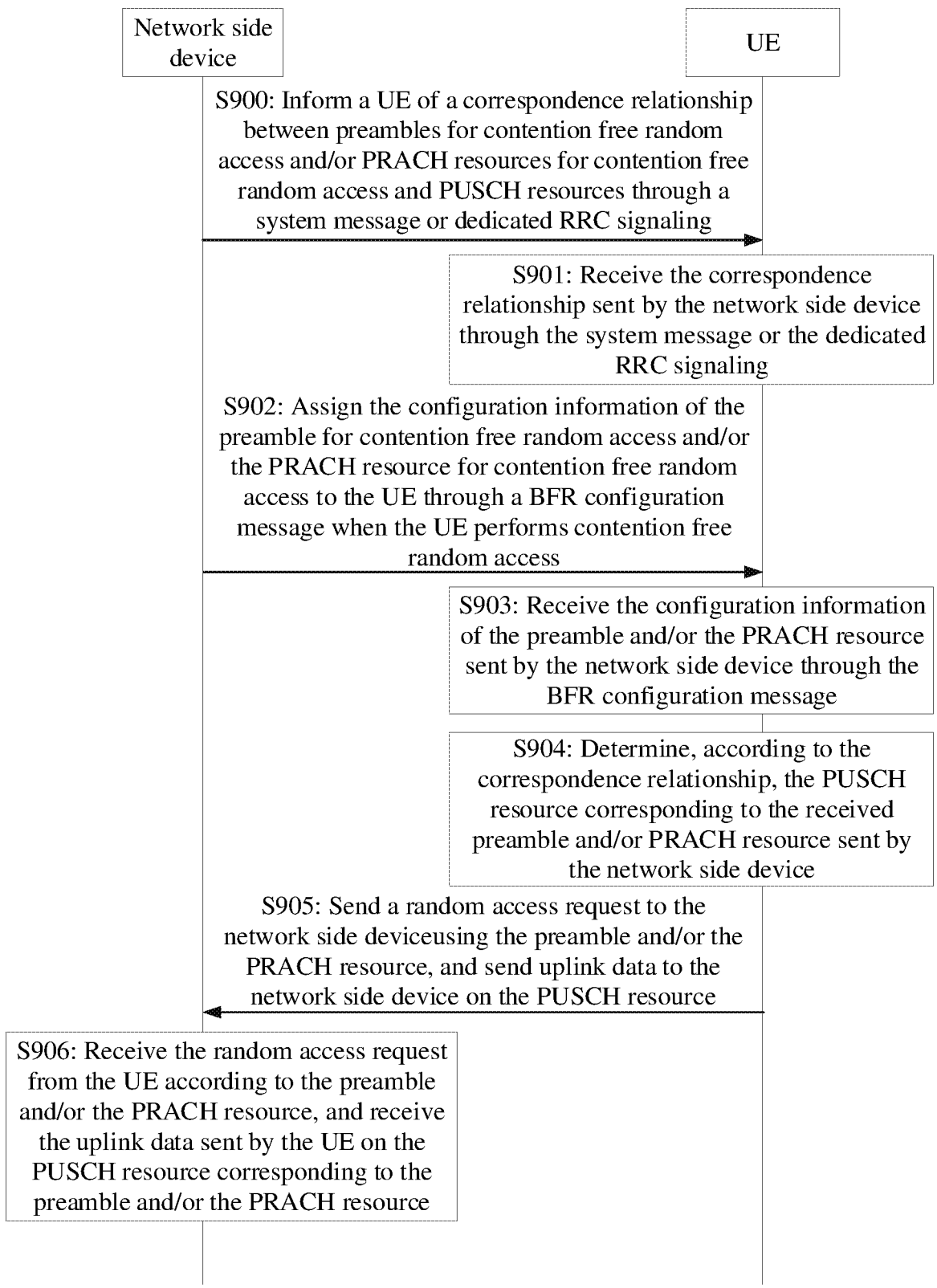
FIG. 9 is a schematic flow chart of fifth contention free random access in an embodiment of the disclosure.

If in embodiment 3 of the disclosure, the method of the abovementioned determining manner 2 is adopted for assisting the UE in determining the PUSCH resource corresponding to the received preamble and/or PRACH resource, a flow of the network side device performing contention free random access with the UE may be shown as FIG. 9, and specific steps are as follows.

S900: the network side device informs the UE of a correspondence relationship between preambles for contention free random access and/or PRACH resources for contention free random access and PUSCH resources through a system message or dedicated RRC signaling.

It should be noted that at the moment, the network side device merely informs the UE of the correspondence relationship between the preambles for contention free random access and/or the PRACH resources for contention free random access and the PUSCH resource. Therefore, the PUSCH resources are not actually used, and the network side device may still schedule the PUSCH resource to other UEs in a cell for uplink transmission.

S901: the UE receives the correspondence relationship sent by the network side device through the system message or the dedicated RRC signaling.

S902: the network side device assigns the configuration information of the preamble for contention free random access and/or the PRACH resource for contention free random access to the UE through a BFR configuration message when the UE performs contention free random access.

S903: the UE receives the configuration information of the preamble and/or the PRACH resource sent by the network side device through the BFR configuration message.

S904: the UE determines, according to the correspondence relationship, the PUSCH resource corresponding to the received preamble and/or PRACH resource sent by the network side device.

S905: the UE sends a random access request to the network side device by using the preamble and/or the PRACH resource, and sends uplink data to the network side device on the PUSCH resource.

S906: the network side device receives the random access request from the UE according to the preamble for contention free random access and/or the PRACH resource for contention free random access, and receives the uplink data sent by the UE on the PUSCH resource corresponding to the preamble for contention free random access and/or the PRACH resource for contention free random access.

Further, in S805 or S906, in a process of receiving, by the network side device, the preamble for contention free random access sent by the UE and the uplink data sent by the UE on the PUSCH resource, there are cases of correct reception and abnormal reception. For different cases, actions executed by the network side device and the UE in embodiment 3 of the disclosure are different, which will be introduced separately below.

Case 1: the network side device determines abnormal reception of the preamble for contention free random access sent by the UE and the uplink data sent on the PUSCH resource.

For example, the network side device determines that the preamble for contention free random access sent by the UE is received while the uplink data sent by the UE on the PUSCH resource is not received.

At the moment, the network side device may send a PDCCH command carrying a C-RNTI to the UE to complete contention resolution, and assigns an uplink transmission resource to the UE.

After receiving the PDCCH command carrying the C-RNTI sent by the network side device, the UE performs resource sending or receiving according to the PDCCH command.

Case 2: the network side device determines correct reception of the preamble for contention free random access sent by the UE and the uplink data sent on the PUSCH resource. That is, the network side device determines that the preamble for contention free random access sent by the UE and the uplink data sent by the UE on the PUSCH resource are received.

At the moment, the network side device sends feedback information of correct reception to the UE.

After receiving the feedback information of correct reception for transmission of the PUSCH resource sent by the network side device, the UE determines success of random access and success transmission on PUSCH.

It should be noted that the methods listed above are only examples, and a specific method may be set by a user. In order to make the objectives, technical solutions, and advantages of the embodiments of the disclosure clearer, the embodiments of the disclosure will be further described in detail with reference to the accompanying drawings. Apparently, the described embodiments are only a part of the embodiments of the disclosure, rather than all the embodiments. Based on the embodiments in the embodiments of the disclosure, all other embodiments obtained by those of ordinary skill in the art without creative effort shall fall within the protection scope of the embodiments of the disclosure.

Figure 10:
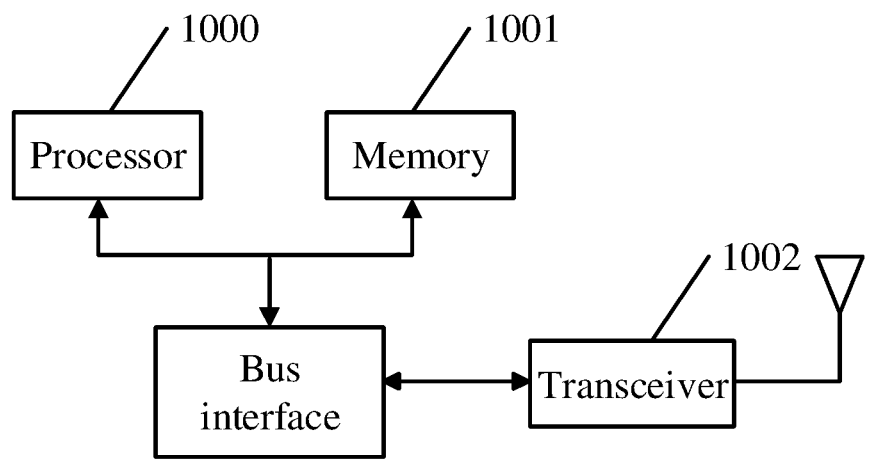
FIG. 10 is a schematic structural diagram of a network side device for the first contention free random access in an embodiment of the disclosure.

As shown in FIG. 10, an embodiment of the disclosure provides a network side device for contention free random access. The network side device includes: a processor 1000, a memory 1001, and a transceiver 1002. The processor 1000 is configured for managing a bus architecture and general processing, and the memory 1001 may store data used by the processor 1000 when the processor 1000 performs operations. The transceiver 1002 is configured to receive and transmit the data under control of the processor 1000.

The bus architecture may include any quantity of interconnected buses and bridges. Specifically, one or more processors represented by the processor 1000 and various circuits of a memory represented by the memory 1001 are linked together. The bus architecture may also link various other circuits such as peripheral devices, voltage regulators, power management circuits, etc., which are all known in the art, and therefore, no further description will be given herein. Bus interfaces provide interfaces. The processor 1000 is responsible for managing the bus architecture and general processing, and the memory 1001 may store the data used by the processor 1000 when the processor 1000 performs the operations.

A flow disclosed in the embodiment of the disclosure may be applied to the processor 1000 or be implemented by the processor 1000. In an implementation process, each step of a signal processing flow may be completed by an integrated logic circuit of hardware in the processor 1000 or through instructions in the form of software. The processor 1000 may be a general-purpose processor, a digital signal processor, an application-specific integrated circuit, a field-programmable gate array or other programmable logic device, a discrete gate or transistor logic device, or a discrete hardware component, and may implement or execute disclosed methods, steps and logic block diagrams in the embodiments of the disclosure. The general-purpose processor may be a microprocessor or any conventional processor or the like. The steps of the method disclosed with reference to the embodiments of the disclosure may be directly embodied as being executed and completed by a hardware processor, or executed and completed by a combination of hardware and software modules in the processor. The software module may be located in a mature storage medium in the art, such as a random access memory, a flash memory, a read-only memory, a programmable read-only memory, an electrically erasable programmable memory or a register. A storage medium is located in the memory 1001, and the processor 1000 reads information in the memory 1001 and completes the steps of the signal processing flow with reference to its hardware.

Specifically, the processor 1000 is configured to read a program in the memory 1001 and execute: sending configuration information of a preamble for contention free random access and/or a PRACH resource for contention free random access to a UE when the UE performs contention free random access, so that the UE sends a random access request through the preamble for contention free random access and/or the PRACH resource for contention free random access, and sends uplink data on a PUSCH resource corresponding to the preamble for contention free random access and/or the PRACH resource for contention free random access; and receiving the random access request from the UE according to the preamble for contention free random access and/or the PRACH resource for contention free random access, and receiving the uplink data from the UE on the PUSCH resource corresponding to the preamble for contention free random access and/or the PRACH resource for contention free random access.

Optionally, the processor 1000 is further configured to: inform the UE of a correspondence relationship between preambles for contention free random access and/or PRACH resources for contention free random access and PUSCH resources through a system message or dedicated RRC signaling.

Optionally, the processor 1000 is further configured to: send the configuration information of the preamble for contention free random access and/or the PRACH resource for contention free random access to the UE through a PDCCH command when the UE performs contention free random access.

Optionally, the processor 1000 is further configured to: send the configuration information of the preamble for contention free random access and/or the PRACH resource for contention free random access to the UE through a synchronous reconfiguration message when the UE performs contention free random access; or send the configuration information of the preamble for contention free random access and/or the PRACH resource for contention free random access to the UE through a BFR configuration message when the UE performs contention free random access.

Optionally, the processor 1000 is further configured to: send the configuration information of the preamble for contention free random access and the PRACH resource for contention free random access as well as configuration information of the PUSCH resource corresponding to the preamble for contention free random access and/or the PRACH resource for contention free random access to the UE through a BFR configuration message when the UE performs contention free random access; or send the configuration information of the preamble for contention free random access and the PRACH resource for contention free random access as well as the configuration information of the PUSCH resource corresponding to the preamble for contention free random access and/or the PRACH resource for contention free random access to the UE through a synchronous reconfiguration message when the UE performs contention free random access.

Optionally, the correspondence relationship between the preambles for contention free random access and/or the PRACH resources for contention free random access and the PUSCH resources includes a part or all of the following: the PRACH resources for contention free random access being in one-to-one correspondence to the PUSCH resources; or the preambles for contention free random access being in one-to-one correspondence to the PUSCH resources; or multiple PRACH resources of the PRACH resources for contention free random access being in correspondence to one PUSCH resource of the PUSCH resources; or multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence to one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, the processor 1000 is further configured to: in a condition that the network side device determines that the preamble for contention free random access from the UE is received while the uplink data sent by the UE on the PUSCH resource is not received: send a random access response MAC RAR to the UE, wherein the MAC RAR includes a UL grant and a TAC; or send a PDCCH command carrying a C-RNTI to the UE to complete contention resolution, and assign an uplink transmission resource to the UE; or in a condition that the network side device determines that the preamble for contention free random access from the UE and the uplink data sent by the UE on the PUSCH resource are correctly received: send feedback information of correct reception to the UE if it is determined that the preamble for contention free random access sent by the UE and the uplink data sent by the UE on the PUSCH resource are correctly received; or assign a new uplink transmission resource to the UE; or perform downlink resource assignment to the UE, and send TAC MAC CE to the UE for timing synchronization adjustment.

Figure 11:
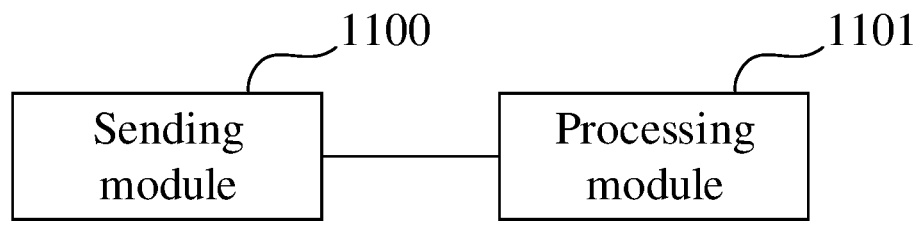
FIG. 11 is a schematic structural diagram of a network side device for the second contention free random access in an embodiment of the disclosure.

As shown in FIG. 11, the disclosure provides a network side device for contention free random access. The network side device includes a sending module 1100 and a processing module 1101.

The sending module 1100 is configured to send configuration information of a preamble for contention free random access and/or a PRACH resource for contention free random access to a UE when the UE performs contention free random access, so that the UE sends a random access request through the preamble for contention free random access and/or the PRACH resource for contention free random access, and sends uplink data on a PUSCH resource corresponding to the preamble for contention free random access and/or the PRACH resource for contention free random access.

The processing module 1101 is configured to receive the random access request from the UE according to the preamble for contention free random access and/or the PRACH resource for contention free random access, and receive the uplink data from the UE on the PUSCH resource corresponding to the preamble for contention free random access and/or the PRACH resource for contention free random access.

Optionally, the sending module 1100 is further configured to: inform the UE of a correspondence relationship between preambles for contention free random access and/or PRACH resources for contention free random access and PUSCH resources through a system message or dedicated RRC signaling.

Optionally, the sending module 1100 is further configured to: send the configuration information of the preamble for contention free random access and/or the PRACH resource for contention free random access to the UE through a PDCCH command when the UE performs contention free random access.

Optionally, the sending module 1100 is further configured to: send the configuration information of the preamble for contention free random access and/or the PRACH resource for contention free random access to the UE through a synchronous reconfiguration message when the UE performs contention free random access; or send the configuration information of the preamble for contention free random access and/or the PRACH resource for contention free random access to the UE through a BFR configuration message when the UE performs contention free random access.

Optionally, the sending module 1100 is further configured to: send the configuration information of the preamble for contention free random access and the PRACH resource for contention free random access as well as configuration information of the PUSCH resource corresponding to the preamble for contention free random access and/or the PRACH resource for contention free random access to the UE through a BFR configuration message when the UE performs contention free random access; or send the configuration information of the preamble for contention free random access and the PRACH resource for contention free random access as well as the configuration information of the PUSCH resource corresponding to the preamble for contention free random access and/or the PRACH resource for contention free random access to the UE through a synchronous reconfiguration message when the UE performs contention free random access.

Optionally, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, the processing module 1101 is further configured to: in a condition that the network side device determines that the preamble for contention free random access from the UE is received while the uplink data sent by the UE on the PUSCH resource is not received: send a random access response MAC RAR to the UE, wherein the random access response includes a UL grant and a TAC; or send a PDCCH command carrying a C-RNTI to the UE to complete contention resolution, and assign an uplink transmission resource to the UE; or the processing module 1101 is further configured to: in a condition that the network side device determines that the preamble for contention free random access from the UE and the uplink data sent by the UE on the PUSCH resource are correctly received: send feedback information of correct reception to the UE; or assign a new uplink transmission resource to the UE; or perform downlink resource assignment for the UE, and send TAC MAC CE to the UE for timing synchronization adjustment.

Based on the same inventive concept, an embodiment of the disclosure further provides a method for performing contention free random access on a network side. Because the method corresponds to the network side device for contention free random access introduced in the embodiment of the disclosure, and a problem solving principle of the method is similar to that of the network side device, so for implementation of the method, reference may be made to implementation of the network side device in the embodiment of the disclosure. Repetition will not be repeated.

Figure 12:
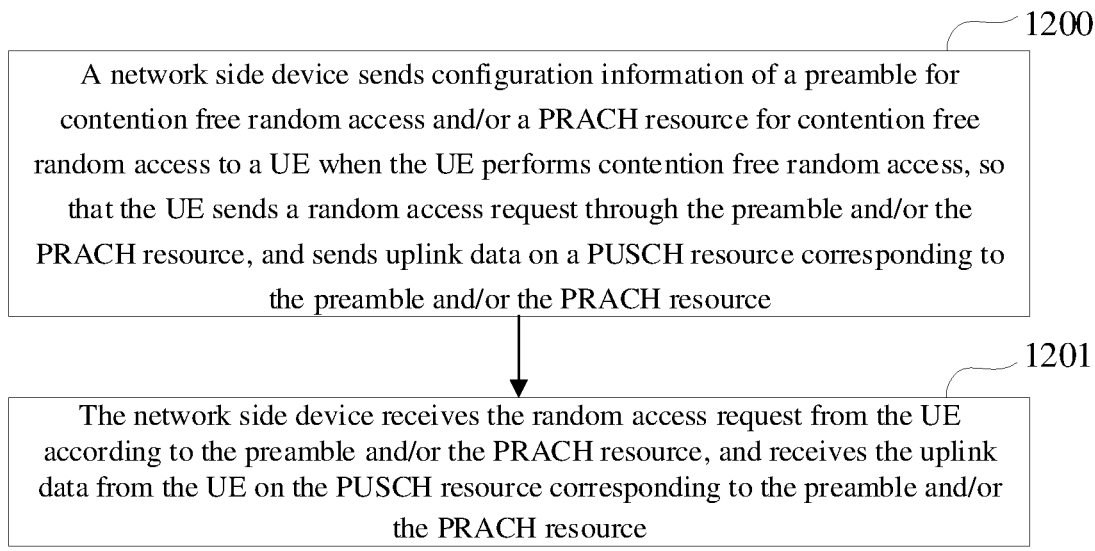
FIG. 12 is a schematic diagram of a contention free random access method of a network side in an embodiment of the disclosure.

As shown in FIG. 12, an embodiment of the disclosure further provides a method for performing contention free random access on a network side. The method includes the following steps.

Step 1200: a network side device sends configuration information of a preamble for contention free random access and/or a PRACH resource for contention free random access to a UE when the UE performs contention free random access, so that the UE sends a random access request through the preamble for contention free random access and/or the PRACH resource for contention free random access, and sends uplink data on a PUSCH resource corresponding to the preamble for contention free random access and/or the PRACH resource for contention free random access.

Step S1201: the network side device receives the random access request from the UE according to the preamble for contention free random access and/or the PRACH resource for contention free random access, and receives the uplink data from the UE on the PUSCH resource corresponding to the preamble for contention free random access and/or the PRACH resource for contention free random access.

Optionally, before the network side device sends the configuration information of the preamble for contention free random access and/or the PRACH resource for contention free random access to the UE when the UE performs contention free random access, the method further includes the following. The network side device informs the UE of a correspondence relationship between preambles for contention free random access and/or PRACH resources for contention free random access and PUSCH resources through a system message or dedicated RRC signaling.

Optionally, the sending, by the network side device, the configuration information of the preamble for contention free random access and/or the PRACH resource for contention free random access to the UE when the UE performs contention free random access includes: the network side device sends the configuration information of the preamble for contention free random access and/or the PRACH resource for contention free random access to the UE through a physical downlink control channel (PDCCH) command when the UE performs contention free random access.

Optionally, the sending, by the network side device, the configuration information of the preamble for contention free random access and/or the PRACH resource for contention free random access to the UE when the UE performs contention free random access includes: the network side device sends the configuration information of the preamble for contention free random access and/or the PRACH resource for contention free random access to the UE through a synchronous reconfiguration message when the UE performs contention free random access; or the network side device sends the configuration information of the preamble for contention free random access and/or the PRACH resource for contention free random access to the UE through a beam failure recovery (BFR) configuration message when the UE performs contention free random access.

Optionally, the sending, by the network side device, the configuration information of the preamble for contention free random access and/or the PRACH resource for contention free random access to the UE when the UE performs contention free random access includes: the network side device sends the configuration information of the preamble for contention free random access and the PRACH resource for contention free random access as well as configuration information of the PUSCH resource corresponding to the preamble for contention free random access and/or the PRACH resource for contention free random access to the UE through a BFR configuration message when the UE performs contention free random access; or the network side device sends the configuration information of the preamble for contention free random access and the PRACH resource for contention free random access as well as the configuration information of the PUSCH resource corresponding to the preamble for contention free random access and/or the PRACH resource for contention free random access to the UE through a synchronous reconfiguration message when the UE performs contention free random access.

Optionally, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, after the network side device receives the random access request from the UE according to the preamble for contention free random access and/or the PRACH resource for contention free random access, and receives the uplink data from the UE on the PUSCH resource corresponding to the preamble for contention free random access and/or the PRACH resource for contention free random access, the method further includes: in a condition that the network side device determines that the preamble for contention free random access from the UE is received while the uplink data sent by the UE on the PUSCH resource is not received: the network side device sends a random access response MAC RAR to the UE, wherein the MAC RAR includes a UL grant and a TAC; or send a PDCCH command carrying a C-RNTI to the UE to complete contention resolution, and assign an uplink transmission resource to the UE. Or in a condition that the network side device determines that the preamble for contention free random access from the UE and the uplink data sent by the UE on the PUSCH resource are correctly received: the network side device sends feedback information of correct reception to the UE; or assign a new uplink transmission resource to the UE; or perform downlink resource assignment to the UE, and send TAC MAC CE to the UE for timing synchronization adjustment.

Figure 13:
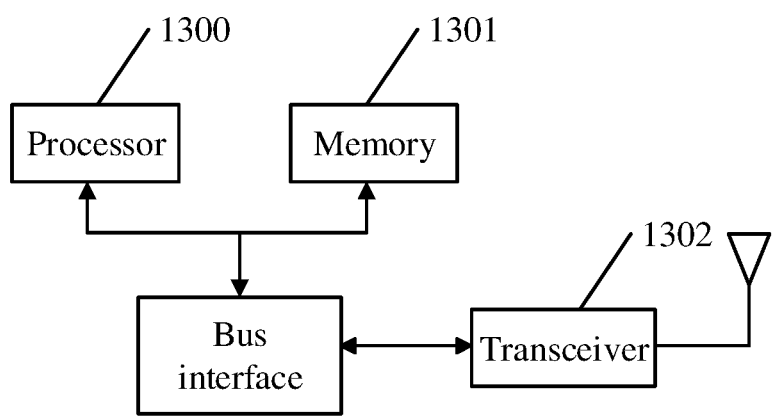
FIG. 13 is a schematic diagram of a UE for the first contention free random access in an embodiment of the disclosure.

As shown in FIG. 13, an embodiment of the disclosure provides a UE for contention free random access. The UE includes a processor 1300, a memory 1301, and a transceiver 1302. The processor 1300 is configured for managing a bus architecture and general processing, and the memory 1301 may store data used by the processor 1300 when the processor 1300 performs operations. The transceiver 1302 is configured to receive and transmit the data under control of the processor 1300.

The bus architecture may include any quantity of interconnected buses and bridges. Specifically, one or more processors represented by the processor 1300 and various circuits of a memory represented by the memory 1301 are linked together. The bus architecture may also link various other circuits such as peripheral devices, voltage regulators, power management circuits, etc., which are all known in the art, and therefore, no further description will be given herein. Bus interfaces provide interfaces. The processor 1300 is responsible for managing the bus architecture and general processing, and the memory 1301 may store the data used by the processor 1300 when the processor 1300 performs the operations.

A flow disclosed in the embodiment of the disclosure may be applied to the processor 1300 or be implemented by the processor 1300. In an implementation process, each step of a signal processing flow may be completed by an integrated logic circuit of hardware in the processor 1000 or through instructions in the form of software. The processor 1300 may be a general-purpose processor, a digital signal processor, an application-specific integrated circuit, a field-programmable gate array or other programmable logic device, a discrete gate or transistor logic device, or a discrete hardware component, and may implement or execute disclosed methods, steps and logic block diagrams in the embodiments of the disclosure. The general-purpose processor may be a microprocessor or any conventional processor or the like. The steps of the method disclosed with reference to the embodiments of the disclosure may be directly embodied as being executed and completed by a hardware processor, or executed and completed by a combination of hardware and software modules in the processor. The software module may be located in a mature storage medium in the art, such as a random access memory, a flash memory, a read-only memory, a programmable read-only memory, an electrically erasable programmable memory or a register. A storage medium is located in the memory 1301, and the processor 1300 reads information in the memory 1301 and completes the steps of the signal processing flow with reference to its hardware.

Specifically, the processor 1301 is configured to read a program in the memory 1301 and execute: receiving configuration information of a preamble for contention free random access and/or a PRACH resource for contention free random access sent by a network side device when the UE performs contention free random access; determining a PUSCH resource corresponding to the received preamble for contention free random access and/or the PRACH resource for contention free random access sent by the network side device; and sending a random access request by using the preamble for contention free random access and/or the PRACH resource for contention free random access, and sending uplink data to the network side device on the PUSCH resource.

Optionally, the processor 1300 is further configured to: receive a correspondence relationship between preambles for contention free random access and/or PRACH resources for contention free random access and PUSCH resources informed by the network side device through a system message or dedicated RRC signaling. Further, the processor 1300 is further configured to: determine, according to the correspondence relationship, the PUSCH resource corresponding to the received preamble for contention free random access and/or the PRACH resource for contention free random access sent by the network side device.

Optionally, the processor 1300 is further configured to: receive configuration information of the preamble for contention free random access and the PRACH resource for contention free random access as well as configuration information of the PUSCH resource corresponding to the preamble for contention free random access and/or the PRACH resource for contention free random access sent all together by the network side device; and further, the processor 1300 is further configured to: determine a PUSCH resource corresponding to the received configuration information of the PUSCH resource sent by the network side device; and determine the PUSCH resource, corresponding to the configuration information of the PUSCH resource, to be the PUSCH resource corresponding to the preamble for contention free random access and/or the PRACH resource for contention free random access.

Optionally, the processor 1300 is further configured to: receive the configuration information of the preamble for contention free random access and/or the PRACH resource for contention free random access sent by the network side device through a PDCCH command.

Optionally, the processor 1300 is further configured to: receive the configuration information of the preamble for contention free random access and/or the PRACH resource for contention free random access sent by the network side device through a synchronous reconfiguration message; or receive the configuration information of the preamble for contention free random access and/or the PRACH resource for contention free random access sent by the network side device through a BFR configuration message.

Optionally, the correspondence relationship between the preambles for contention free random access and/or the PRACH resources for contention free random access and the PUSCH resource includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, the processor 1300 is further configured to: perform uplink synchronization adjustment according to a TAC in the MAC RAR, and perform uplink transmission in a UL grant assigned by the MAC RAR, in a condition that the UE determines that the MAC RAR from the network side device is received; or perform resource sending or receiving according to the command, in a condition that the UE determines that the PDCCH command carrying a cell radio network temporary identifier (C-RNTI) from the network side device is received. Or the processor 1300 is further configured to: determine success of random access and success transmission on PUSCH in a condition that the UE determines that the UE receives feedback information of correct reception for PUSCH resource transmission sent by the network side device, or a new uplink transmission scheduling command issued by the network side device, or TAC MAC CE transmitted by the network side device, and perform following operations according to received information sent by the network side device.

Figure 14:
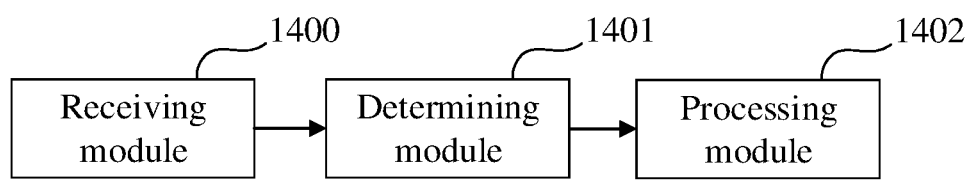
FIG. 14 is a schematic diagram of a UE for the second contention free random access in an embodiment of the disclosure.

As shown in FIG. 14, a UE for contention free random access is provided. The UE includes: a receiving module 1400: configured to receive configuration information of a preamble for contention free random access and/or a PRACH resource for contention free random access sent by a network side device when a UE performs contention free random access; a determining module 1401: configured to determine a PUSCH resource corresponding to the received preamble for contention free random access and/or the PRACH resource for contention free random access sent by the network side device; and a processing module 1402: configured to send a random access request by using the preamble for contention free random access and/or the PRACH resource for contention free random access, and send uplink data to the network side device on the PUSCH resource.

Optionally, the receiving module 1400 is further configured to: receive a correspondence relationship between preambles for contention free random access and/or PRACH resources for contention free random access and PUSCH resources informed by the network side device through a system message or dedicated RRC signaling; and further, the determining module 1401 is further configured to: determine, according to the correspondence relationship, the PUSCH resource corresponding to the received preamble for contention free random access and/or the PRACH resource for contention free random access sent by the network side device.

Optionally, the receiving module 1400 is further configured to: receive configuration information of the preamble for contention free random access and the PRACH resource for contention free random access as well as configuration information of the PUSCH resource corresponding to the preamble for contention free random access and/or the PRACH resource for contention free random access sent all together by the network side device; and further, the determining module 1401 is further configured to: determine a PUSCH resource corresponding to the received configuration information of the PUSCH resource sent by the network side device; and determine the PUSCH resource, corresponding to the configuration information of the PUSCH resource, to be the PUSCH resource corresponding to the preamble for contention free random access and/or the PRACH resource for contention free random access.

Optionally, the receiving module 1400 is further configured to: receive the configuration information of the preamble for contention free random access and/or the PRACH resource for contention free random access sent by the network side device through a PDCCH command.

Optionally, the receiving module 1400 is further configured to: receive the configuration information of the preamble for contention free random access and/or the PRACH resource for contention free random access sent by the network side device through a synchronous reconfiguration message; or receive the configuration information of the preamble for contention free random access and/or the PRACH resource for contention free random access sent by the network side device through a BFR configuration message.

Optionally, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, the processing module 1402 is further configured to: perform uplink synchronization adjustment according to a TAC in the MAC RAR, and perform uplink transmission in a UL grant assigned by the MAC RAR, in a condition that the UE determines that the MAC RAR from the network side device is received; or perform resource sending or receiving according to the PDCCH command, in a condition that the UE determines that the PDCCH command carrying a cell radio network temporary identifier (C-RNTI) from the network side device is received; or determine success of random access and success transmission on PUSCH in a condition that the UE determines that the UE receives feedback information of correct reception for PUSCH resource transmission from the network side device, or a new uplink transmission scheduling command from the network side device, or TAC MAC CE from the network side device, and perform operations according to the information received from the network side device.

Based on the same inventive concept, an embodiment of the disclosure further provides a contention free random access method for a UE. Because the method corresponds to the UE for contention free random access introduced in the embodiment of the disclosure, and a problem solving principle of the method is similar to that of the UE, so for implementation of the method, reference may be made to implementation of the UE in the embodiment of the disclosure. Repetition will not be repeated.

Figure 15:
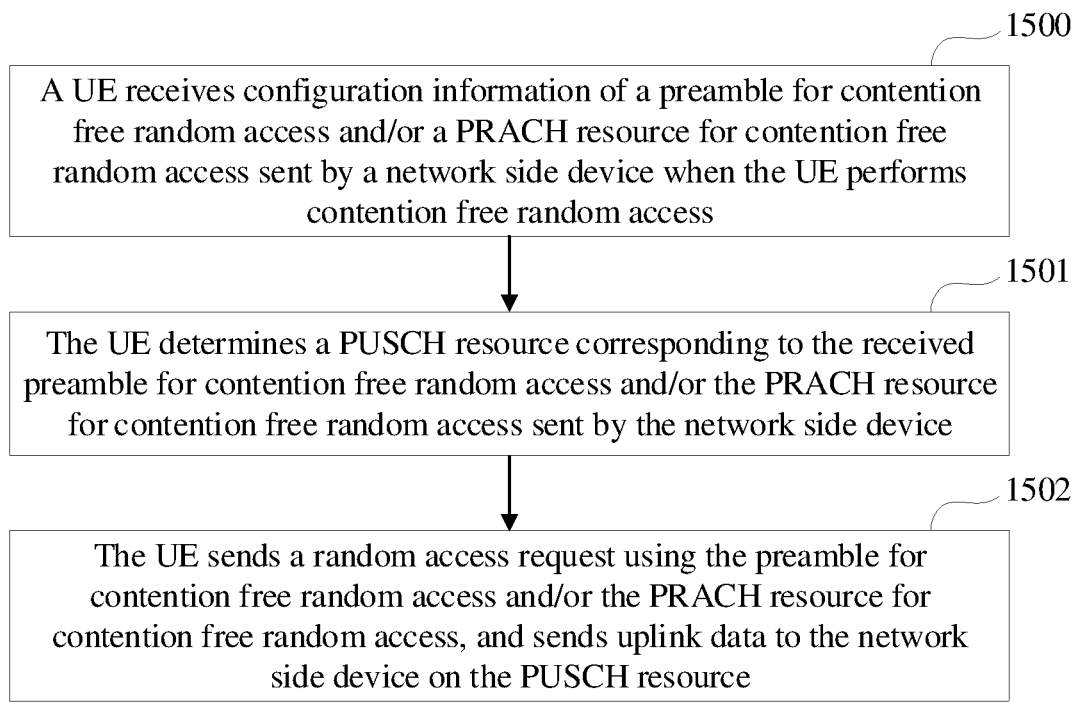
FIG. 15 is a schematic diagram of a contention free random access method of a UE side in an embodiment of the disclosure.

As shown in FIG. 15, an embodiment of the disclosure further provides a method of a UE performing contention free random access. The method includes the following.

Step 1500: a UE receives configuration information of a preamble for contention free random access and/or a PRACH resource for contention free random access sent by a network side device when the UE performs contention free random access.

Step 1501: the UE determines a PUSCH resource corresponding to the received preamble for contention free random access and/or the PRACH resource for contention free random access sent by the network side device.

Step 1502: the UE sends a random access request using the preamble for contention free random access and/or the PRACH resource for contention free random access, and sends uplink data to the network side device on the PUSCH resource.

Optionally, before the UE receives the configuration information of the preamble for contention free random access and/or the PRACH resource for contention free random access sent by the network side device when the UE performs contention free random access, the UE receives a correspondence relationship between preambles for contention free random access and/or PRACH resources for contention free random access and PUSCH resources informed by the network side device through a system message or dedicated RRC signaling; and determining, by the UE, the PUSCH resource corresponding to the received preamble for contention free random access and/or the PRACH resource for contention free random access sent by the network side device includes: the UE determines the PUSCH resource corresponding to the received preamble for contention free random access and/or the PRACH resource for contention free random access sent by the network side device according to the correspondence relationship.

Optionally, receiving, by the UE, the configuration information of the preamble for contention free random access and/or the PRACH resource for contention free random access sent by the network side device when the UE performs contention free random access includes: the UE receives configuration information of the preamble for contention free random access and the PRACH resource for contention free random access as well as configuration information of the PUSCH resource corresponding to the preamble for contention free random access and/or the PRACH resource for contention free random access sent all together by the network side device; and determining, by the UE, the PUSCH resource corresponding to the received preamble for contention free random access and/or the PRACH resource for contention free random access sent by the network side device includes: the UE determines a PUSCH resource corresponding to the received configuration information of the PUSCH resource sent by the network side device; and the UE determines the PUSCH resource, corresponding to the configuration information of the PUSCH resource, to be the PUSCH resource corresponding to the preamble for contention free random access and/or the PRACH resource for contention free random access.

Optionally, receiving, by the UE, the configuration information of the preamble for contention free random access and/or the PRACH resource for contention free random access sent by the network side device when the UE performs contention free random access includes: the UE receives the configuration information of the preamble for contention free random access and/or the PRACH resource for contention free random access sent by the network side device through a PDCCH command.

Optionally, receiving, by the UE, the configuration information of the preamble for contention free random access and/or the PRACH resource for contention free random access sent by the network side device when the UE performs contention free random access includes: the UE receives the configuration information of the preamble for contention free random access and/or the PRACH resource for contention free random access sent by the network side device through a synchronous reconfiguration message; or the UE receives the configuration information of the preamble for contention free random access and/or the PRACH resource for contention free random access sent by the network side device through a BFR configuration message.

Optionally, the correspondence relationship between the preambles for contention free random access and/or the PRACH resources for contention free random access and the PUSCH resources includes a part or all of the following: the PRACH resources for contention free random access being in one-to-one correspondence to the PUSCH resources; the preambles for contention free random access being in one-to-one correspondence to the PUSCH resources; multiple PRACH resources of the PRACH resources for contention free random access being in correspondence to one PUSCH resource of the PUSCH resources; multiple preambles of the preambles for contention free random access being in correspondence to one PUSCH resource of the PUSCH resources; or a combination of a PRACH resource and a preamble being in correspondence to one PUSCH resource of the PUSCH resources.

The combination of the PRACH resource and the preamble being in correspondence one PUSCH resource of the PUSCH resources includes one of the following: a PRACH resource of the PRACH resources for contention free random access and a preamble of the preambles for contention free random access being in correspondence to one PUSCH resource of the PUSCH resources; a PRACH resource of the PRACH resources for contention free random access and a preamble for contention based random access being in correspondence to one PUSCH resource of the PUSCH resources; a PRACH resource for contention based random access and a preamble of the preambles for contention free random access being in correspondence to one PUSCH resource of the PUSCH resources; a PRACH resource of the PRACH resources for contention free random access, a PRACH resource for contention based random access and a preamble for contention based random access being in correspondence to one PUSCH resource of the PUSCH resources; a preamble of the preambles for contention free random access, a PRACH resource for contention based random access and a preamble for contention based random access being in correspondence to one PUSCH resource of the PUSCH resources; a PRACH resource of the PRACH resources for contention free random access, a preamble of the preambles for contention free random access and a PRACH resource for contention based random access being in correspondence to one PUSCH resource of the PUSCH resources; a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

Optionally, after the UE performs data transmission with the network side device on the PUSCH resource, the method further includes: the UE performs uplink synchronization adjustment according to a TAC in the MAC RAR, and performs uplink transmission in a UL grant assigned by the MAC RAR, in a condition that the UE determines that the MAC RAR from the network side device is received; or the UE performs resource sending or receiving according to the PDCCH command, in a condition that the UE determines that the PDCCH command carrying a cell radio network temporary identifier (C-RNTI) from the network side device is received; or the UE determines success of random access and success transmission on PUSCH in a condition that the UE determines that the UE receives feedback information of correct reception for PUSCH resource transmission from the network side device, or a new uplink transmission scheduling command from the network side device, or TAC MAC CE from the network side device, and performing, by the UE, operations according to the information received from the network side device.

In some possible implementations, various aspects of the contention free random access method provided in the embodiments of the disclosure may also be implemented in the form of a program product, which includes a program code. When the program code runs on a computer device, the program code is used to make a computer device execute the steps in the contention free random access method according to various exemplary embodiments of the disclosure described in this specification.

The program product may adopt any combination of one or a plurality of readable media. The readable medium may be a readable signal medium or a readable storage medium. The readable storage medium may be, for example, but not limited to, an electrical, magnetic, optical, electromagnetic, infrared, or semiconductor system, apparatus, or member, or a combination of any of the above. More specific examples (non-exhaustive list) of readable storage media include: an electrical connection with one or more wires, a portable disk, a hard disk, a random access memory (RAM), a read-only memory (ROM), an erasable programmable read-only memory (EPROM or flash memory), optical fibers, a portable compact disk read-only memory (CD-ROM), an optical storage device, a magnetic storage device, or any suitable combination of the above.

The program product for contention free random access according to the embodiments of the disclosure may adopt a portable compact disk read-only memory (CD-ROM) and include a program code, and may run on a server device. However, the program product of the disclosure is not limited to this. In this document, the readable storage medium may be any tangible medium that contains or stores a program, and the program may be used by or in combination with information transmission, an apparatus, or a device.

The readable signal medium may include a data signal propagated in baseband or as a part of a carrier wave, and a readable program code is carried therein. This propagated data signal may take many forms, including, but not limited to, electromagnetic signals, optical signals, or any suitable combination of the above. The readable signal medium may also be any readable medium other than a readable storage medium, and the readable medium may send, propagate, or transmit a program for use by or in combination with a periodic network action system, apparatus, or device.

The program code contained on the readable medium may be transmitted by any suitable medium, including, but not limited to, wireless, wired, optical cable, RF, etc., or any suitable combination of the above.

A program code used to perform the operations of the disclosure may be written in any combination of one or more programming languages. The programming languages include object-oriented programming languages-such as Java, C++, etc., as well as conventional procedural programming languages, such as programming languages including "C" language or similar programming language. The program code may be executed entirely on a user's computing device, partly on the user's device, executed as an independent software package, partly on the user's computing device and partly executed on a remote computing device, or entirely executed on the remote computing device or server. In the case of a remote computing device, the remote computing device may be connected to the user's computing device through any kind of network, including a local area network (LAN) or a wide area network (WAN), or may be connected to an external computing device.

An embodiment of the disclosure further provides a computing device-readable storage medium for a method for contention free random access on a network side, that is, content is not lost after a power failure. The storage medium stores a software program, including a program code. When the program code runs on a computing device, the software program may implement a solution for any contention free random access network side device of the above embodiments of the disclosure when it is read and executed by one or more processors.

An embodiment of the disclosure further provides a computing device-readable storage medium for a method of a UE performing contention free random access, that is, content is not lost after a power failure. The storage medium stores a software program, including a program code. When the program code runs on a computing device, the software program may implement a solution for any contention free random access network side device of the above embodiments of the disclosure when it is read and executed by one or more processors.

In the above-mentioned embodiments of the disclosure, in order to realize the functions in the methods provided in the above-mentioned embodiments of the disclosure, a data transmission device may include a hardware structure and/or a software module, and the functions are implemented in the form of a hardware structure, a software module, or a hardware structure plus a software module. Whether a certain function of the above-mentioned functions is executed by a hardware structure, a software module, or a hardware structure plus a software module depends on specific application and design constraint conditions of the technical solution.

The disclosure is described above with reference to block diagrams and/or flowcharts showing methods, apparatuses (systems) and/or computer program products according to the embodiments of the disclosure. It should be understood that one block of a block diagram and/or flowchart diagram and a combination of blocks in the block diagram and/or flowchart diagram may be implemented by computer program instructions. These computer program instructions may be provided to a processor of a general-purpose computer or a special-purpose computer, and/or other programmable data processing apparatus to produce a machine, so that instructions executed via the computer processor and/or other programmable data processing apparatus create a method for implementing the functions/actions specified in the block diagrams and/or flowchart blocks.

Correspondingly, hardware and/or software (including firmware, resident software, microcode, etc.) may also be used to implement the disclosure. Furthermore, the disclosure may take the form of a computer program product on a computer-usable or computer-readable storage medium, which has a computer-usable or computer-readable program code implemented in the medium to be used by or in combination with an instruction execution system. In the context of the disclosure, the computer-usable or computer-readable medium may be any medium that may contain, store, communicate, transmit, or transfer a program for use by the instruction execution system, apparatus, or device, or use in combination with the instruction execution system, apparatus or device.

Apparently, those of skill in the art can make various changes and modifications to the disclosure without departing from the spirit and scope of the disclosure. In this way, if these modifications and variations of the disclosure fall within the scope of the claims of the disclosure and their equivalent technologies, the disclosure is also intended to include these modifications and variations.

What is claimed is:

1. A contention free random access method, comprising:
   sending, by a network side device, configuration information of a preamble for contention free random access and a physical random access channel (PRACH) resource for contention free random access, or a PRACH resource for contention free random access to a user equipment (UE) in response to that the UE performs contention free random access; and
   receiving, by the network side device, a random access request from the UE according to the preamble for contention free random access and the PRACH resource for contention free random access, or the PRACH resource for contention free random access, and receiving uplink data from the UE on a physical uplink shared channel (PUSCH) resource corresponding to the preamble for contention free random access and the PRACH resource for contention free random access, or the PRACH resource for contention free random access;
   wherein a correspondence relationship between preambles for contention free random access and PRACH resources for contention free random access and PUSCH resources or between PRACH resources for contention free random access and PUSCH resources comprises:
   the preambles for contention free random access being in one-to-one correspondence to the PUSCH resources; or
   multiple preambles of the preambles for contention free random access being in correspondence to one PUSCH resource of the PUSCH resources; or
   a combination of a PRACH resource and a preamble being in correspondence to one PUSCH resource of the PUSCH resources.

2. The method according to claim 1, wherein before the network side device sends the configuration information of the preamble for contention free random access and the PRACH resource for contention free random access, or the PRACH resource for contention free random access to the UE in response to that the UE performs contention free random access, the method further comprises:
   informing, by the network side device, the UE of the correspondence relationship between the preambles for contention free random access and the PRACH resources for contention free random access and the PUSCH resources, or between the PRACH resources for contention free random access and the PUSCH resources through a system message or a dedicated radio resource control (RRC) signaling.

3. The method according to claim 2, wherein the sending, by the network side device, the configuration information of the preamble for contention free random access and the PRACH resource for contention free random access, or the PRACH resource for contention free random access to the UE in response to that the UE performs contention free random access comprises:
- sending, by the network side device, the configuration information of the preamble for contention free random access and the PRACH resource for contention free random access, or the PRACH resource for contention free random access to the UE through a physical downlink control channel (PDCCH) command in response to that the UE performs contention free random access; or
- sending, by the network side device, the configuration information of the preamble for contention free random access and the PRACH resource for contention free random access, or the PRACH resource for contention free random access to the UE through a synchronous reconfiguration message in response to that the UE performs contention free random access; or
- sending, by the network side device, the configuration information of the preamble for contention free random access and the PRACH resource for contention free random access, or the PRACH resource for contention free random access to the UE through a beam failure recovery (BFR) configuration message in response to that the UE performs contention free random access.

4. The method according to claim 1, wherein the sending, by the network side device, the configuration information of the preamble for contention free random access and the PRACH resource for contention free random access, or the PRACH resource for contention free random access to the UE in response to that the UE performs contention free random access comprises:
- sending, by the network side device, the configuration information of the preamble for contention free random access and the PRACH resource for contention free random access as well as configuration information of the PUSCH resource corresponding to the preamble for contention free random access and the PRACH resource for contention free random access, or the PRACH resource for contention free random access to the UE through a beam failure recovery (BFR) configuration message in response to that the UE performs contention free random access; or
- sending, by the network side device, the configuration information of the preamble for contention free random access and the PRACH resource for contention free random access as well as the configuration information of the PUSCH resource corresponding to the preamble for contention free random access and the PRACH resource for contention free random access, or the PRACH resource for contention free random access to the UE through a synchronous reconfiguration message in response to that the UE performs contention free random access.

5. The method according to claim 1, wherein:
the combination of the PRACH resource and the preamble being in correspondence to one PUSCH resource of the PUSCH resources comprises one of the following:
- a PRACH resource of the PRACH resources for contention free random access and a preamble of the preambles for contention free random access being in correspondence to one PUSCH resource of the PUSCH resources;
- a PRACH resource of the PRACH resources for contention free random access and a preamble for contention based random access being in correspondence to one PUSCH resource of the PUSCH resources;
- a PRACH resource for contention based random access and a preamble of the preambles for contention free random access being in correspondence to one PUSCH resource of the PUSCH resources;
- a PRACH resource of the PRACH resources for contention free random access, a PRACH resource for contention based random access and a preamble for contention based random access being in correspondence to one PUSCH resource of the PUSCH resources;
- a preamble of the preambles for contention free random access, a PRACH resource for contention based random access and a preamble for contention based random access being in correspondence to one PUSCH resource of the PUSCH resources;
- a PRACH resource of the PRACH resources for contention free random access, a preamble of the preambles for contention free random access and a PRACH resource for contention based random access being in correspondence to one PUSCH resource of the PUSCH resources;
- a PRACH resource of the PRACH resources for contention free random access, a preamble of the preambles for contention free random access and a preamble for contention based random access being in correspondence to one PUSCH resource of the PUSCH resources; or
- a PRACH resource of the PRACH resources for contention free random access, a preamble of the preambles for contention free random access, a PRACH resource for contention based random access and a preamble for contention based random access being in correspondence to one PUSCH resource of the PUSCH resources.

6. A contention free random access method, comprising:
- receiving, by a user equipment (UE), configuration information of a preamble for contention free random access and a physical random access channel (PRACH) resource for contention free random access, or a PRACH resource for contention free random access from a network side device in response to that the UE performs contention free random access;
- determining, by the UE, a physical uplink shared channel (PUSCH) resource corresponding to the preamble for contention free random access and the PRACH resource for contention free random access, or the PRACH resource for contention free random access from the network side device; and
- sending, by the UE, a random access request by using the preamble for contention free random access and the PRACH resource for contention free random access, or the PRACH resource for contention free random access, and sending uplink data to the network side device on the PUSCH resource;
- wherein a correspondence relationship between preambles for contention free random access and PRACH resources for contention free random access and PUSCH resources or between PRACH resources for contention free random access and PUSCH resources comprises:
the preambles for contention free random access being in one-to-one correspondence to the PUSCH resources; or
multiple preambles of the preambles for contention free random access being in correspondence to one PUSCH resource of the PUSCH resources; or
a combination of a PRACH resource and a preamble being in correspondence to one PUSCH resource of the PUSCH resources.

7. The method according to claim 6, wherein before the UE receives the configuration information of the preamble for contention free random access and the PRACH resource for contention free random access, or the PRACH resource for contention free random access from the network side device in response to that the UE performs contention free random access, the method comprises:
receiving, by the UE, the correspondence relationship between the preambles for contention free random access and the PRACH resources for contention free random access and the PUSCH resources or between the PRACH resources for contention free random access and the PUSCH resources informed by the network side device through a system message or dedicated radio resource control (RRC) signaling; and
determining, by the UE, the PUSCH resource corresponding to the preamble for contention free random access and the PRACH resource for contention free random access, or the PRACH resource for contention free random access received from the network side device comprises:
determining, by the UE, the PUSCH resource corresponding to the preamble for contention free random access and the PRACH resource for contention free random access, or the PRACH resource for contention free random access received from the network side device according to the correspondence relationship.

8. The method according to claim 6, wherein the receiving, by the UE, the configuration information of the preamble for contention free random access and the PRACH resource for contention free random access, or the PRACH resource for contention free random access from the network side device in response to that the UE performs contention free random access comprises:
receiving, by the UE, configuration information of the preamble for contention free random access and the PRACH resource for contention free random access as well as configuration information of the PUSCH resource corresponding to the preamble for contention free random access and the PRACH resource for contention free random access, or the PRACH resource for contention free random access sent all together by the network side device; and
the determining, by the UE, the PUSCH resource corresponding to the preamble for contention free random access and the PRACH resource for contention free random access, or the PRACH resource for contention free random access received from the network side device comprises:
determining, by the UE, a PUSCH resource corresponding to the configuration information of the PUSCH resource received from the network side device; and
determining, by the UE, the PUSCH resource, corresponding to the configuration information of the PUSCH resource, to be the PUSCH resource corresponding to the preamble for contention free random access and the PRACH resource for contention free random access, or the PRACH resource for contention free random access.

9. The method according to claim 6, wherein the receiving, by the UE, the configuration information of the preamble for contention free random access and the PRACH resource for contention free random access, or the PRACH resource for contention free random access from the network side device in response to that the UE performs contention free random access comprises:
receiving, by the UE, the configuration information of the preamble for contention free random access and the PRACH resource for contention free random access, or the PRACH resource for contention free random access from the network side device through a physical downlink control channel (PDCCH) command; or
receiving, by the UE, the configuration information of the preamble for contention free random access and the PRACH resource for contention free random access, or the PRACH resource for contention free random access from the network side device through a synchronous reconfiguration message; or
receiving, by the UE, the configuration information of the preamble for contention free random access and the PRACH resource for contention free random access, or the PRACH resource for contention free random access from the network side device through a beam failure recovery (BFR) configuration message.

10. The method according to claim 6, wherein:
the combination of the PRACH resource and the preamble being in correspondence to one PUSCH resource of the PUSCH resources comprises one of the following:
a PRACH resource of the PRACH resources for contention free random access and a preamble of the preambles for contention free random access being in correspondence to one PUSCH resource of the PUSCH resources;
a PRACH resource of the PRACH resources for contention free random access and a preamble for contention based random access being in correspondence to one PUSCH resource of the PUSCH resources;
a PRACH resource for contention based random access and a preamble of the preambles for contention free random access being in correspondence to one PUSCH resource of the PUSCH resources;
a PRACH resource of the PRACH resources for contention free random access, a PRACH resource for contention based random access and a preamble for contention based random access being in correspondence to one PUSCH resource of the PUSCH resources;
a preamble of the preambles for contention free random access, a PRACH resource for contention based random access and a preamble for contention based random access being in correspondence to one PUSCH resource of the PUSCH resources;
a PRACH resource of the PRACH resources for contention free random access, a preamble of the preambles for contention free random access and a PRACH resource for contention based random access being in correspondence to one PUSCH resource of the PUSCH resources;
a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

11. A network side device, comprising: a processor, a memory, and a transceiver; wherein:
the processor is configured to read a program in the memory to perform the method according to claim 6.

12. The device according to claim 11, wherein the processor is further configured to:
inform the UE of the correspondence relationship between the preambles for contention free random access and the PRACH resources for contention free random access and the PUSCH resources or between the PRACH resources for contention free random access and the PUSCH resources through a system message or a dedicated radio resource control (RRC) signaling.

13. The device according to claim 12, wherein the processor is further configured to:
send the configuration information of the preamble for contention free random access and the PRACH resource for contention free random access, or the PRACH resource for contention free random access to the UE through a physical downlink control channel (PDCCH) command in response to that the UE performs contention free random access; or
send the configuration information of the preamble for contention free random access and the PRACH resource for contention free random access, or the PRACH resource for contention free random access to the UE through a synchronous reconfiguration message in response to that the UE performs contention free random access; or
send the configuration information of the preamble for contention free random access and the PRACH resource for contention free random access, or the PRACH resource for contention free random access to the UE through a beam failure recovery (BFR) configuration message in response to that the UE performs contention free random access.

14. The device according to claim 11, wherein the processor is further configured to:
send the configuration information of the preamble for contention free random access and the PRACH resource for contention free random access as well as configuration information of the PUSCH resource corresponding to the preamble for contention free random access and the PRACH resource for contention free random access, or the PRACH resource for contention free random access to the UE through a beam failure recovery (BFR) configuration message in response to that the UE performs contention free random access; or
send the configuration information of the preamble for contention free random access and the PRACH resource for contention free random access as well as the configuration information of the PUSCH resource corresponding to the preamble for contention free random access and the PRACH resource for contention free random access, or the PRACH resource for contention free random access to the UE through a synchronous reconfiguration message in response to that the UE performs contention free random access.

15. The device according to claim 11, wherein:
the combination of the PRACH resource and the preamble being in correspondence to one PUSCH resource of the PUSCH resources comprises one of the following:
a PRACH resource of the PRACH resources for contention free random access and a preamble of the preambles for contention free random access being in correspondence to one PUSCH resource of the PUSCH resources;
a PRACH resource of the PRACH resources for contention free random access and a preamble for contention based random access being in correspondence to one PUSCH resource of the PUSCH resources;
a PRACH resource for contention based random access and a preamble of the preambles for contention free random access being in correspondence to one PUSCH resource of the PUSCH resources;
a PRACH resource of the PRACH resources for contention free random access, a PRACH resource for contention based random access and a preamble for contention based random access being in correspondence to one PUSCH resource of the PUSCH resources;
a preamble of the preambles for contention free random access, a PRACH resource for contention based random access and a preamble for contention based random access being in correspondence to one PUSCH resource of the PUSCH resources;
a PRACH resource of the PRACH resources for contention free random access, a preamble of the preambles for contention free random access and a PRACH resource for contention based random access being in correspondence to one PUSCH resource of the PUSCH resources;
a PRACH resource of the PRACH resources for contention free random access, a preamble of the preambles for contention free random access and a preamble for contention based random access being in correspondence to one PUSCH resource of the PUSCH resources; or
a PRACH resource of the PRACH resources for contention free random access, a preamble of the preambles for contention free random access, a PRACH resource for contention based random access and a preamble for contention based random access being in correspondence to one PUSCH resource of the PUSCH resources.

16. A user equipment (UE), comprising: a processor, a memory, and a transceiver; wherein:
the processor is configured to read a program in the memory to:
receive configuration information of a preamble for contention free random access and a physical random access channel (PRACH) resource for contention free random access, or a PRACH resource for contention free random access from a network side device in response to that the UE performs contention free random access;
determine a physical uplink shared channel (PUSCH) resource corresponding to the preamble for contention free random access and the PRACH resource for contention free random access, or the PRACH resource for contention free random access received from the network side device; and
send a random access request by using the preamble for contention free random access and the PRACH resource for contention free random access, or the PRACH resource for contention free random access, and sending uplink data to the network side device on the PUSCH resource;

wherein a correspondence relationship between preambles for contention free random access and PRACH resources for contention free random access and PUSCH resources or between PRACH resources for contention free random access and PUSCH resources comprises:

the preambles for contention free random access being in one-to-one correspondence to the PUSCH resources; or multiple preambles of the preambles for contention free random access being in correspondence to one PUSCH resource of the PUSCH resources; or a combination of a PRACH resource and a preamble being in correspondence to one PUSCH resource of the PUSCH resources.

17. The user equipment according to claim 16, wherein the processor is further configured to:

receive the correspondence relationship between the preambles for contention free random access and the PRACH resources for contention free random access and the PUSCH resources or between the PRACH resources for contention free random access and the PUSCH resources informed by the network side device through a system message or dedicated radio resource control (RRC) signaling; and determine, according to the correspondence relationship, the PUSCH resource corresponding to the preamble for contention free random access and the PRACH resource for contention free random access, or the PRACH resource for contention free random access received from the network side device.

18. The user equipment according to claim 16, wherein the processor is further configured to:

receive configuration information of the preamble for contention free random access and the PRACH resource for contention free random access as well as configuration information of the PUSCH resource corresponding to the preamble for contention free random access and the PRACH resource for contention free random access, or the PRACH resource for contention free random access sent all together by the network side device;

determine a PUSCH resource corresponding to the configuration information of the PUSCH resource received from the network side device; and determine the PUSCH resource, corresponding to the configuration information of the PUSCH resource, to be the PUSCH resource corresponding to the preamble for contention free random access and the PRACH resource for contention free random access, or the PRACH resource for contention free random access.

19. The user equipment according to claim 16, wherein the processor is further configured to:

receive the configuration information of the preamble for contention free random access and the PRACH resource for contention free random access, or the PRACH resource for contention free random access from the network side device through a physical downlink control channel (PDCCH) command; or receive the configuration information of the preamble for contention free random access and the PRACH resource for contention free random access, or the PRACH resource for contention free random access from the network side device through a synchronous reconfiguration message; or receive the configuration information of the preamble for contention free random access and the PRACH resource for contention free random access, or the PRACH resource for contention free random access from the network side device through a beam failure recovery (BFR) configuration message.

20. The user equipment according to claim 16, wherein:

the combination of the PRACH resource and the preamble being in correspondence to one PUSCH resource of the PUSCH resources comprises one of the following:

a PRACH resource of the PRACH resources for contention free random access and a preamble of the preambles for contention free random access being in correspondence to one PUSCH resource of the PUSCH resources;

a PRACH resource of the PRACH resources for contention free random access and a preamble for contention based random access being in correspondence to one PUSCH resource of the PUSCH resources;

a PRACH resource for contention based random access and a preamble of the preambles for contention free random access being in correspondence to one PUSCH resource of the PUSCH resources;

a PRACH resource of the PRACH resources for contention free random access, a PRACH resource for contention based random access and a preamble for contention based random access being in correspondence to one PUSCH resource of the PUSCH resources;

a preamble of the preambles for contention free random access, a PRACH resource for contention based random access and a preamble for contention based random access being in correspondence to one PUSCH resource of the PUSCH resources;

a PRACH resource of the PRACH resources for contention free random access, a preamble of the preambles for contention free random access and a PRACH resource for contention based random access being in correspondence to one PUSCH resource of the PUSCH resources;

a PRACH resource of the PRACH resources for contention free random access, a preamble of the preambles for contention free random access and a preamble for contention based random access being in correspondence to one PUSCH resource of the PUSCH resources; or a PRACH resource of the PRACH resources for contention free random access, a preamble of the preambles for contention free random access, a PRACH resource for contention based random access and a preamble for contention based random access being in correspondence to one PUSCH resource of the PUSCH resources.

\* \* \* \* \*